MEANS FOR STORING DATA
SIGNALS-46

FIG. 6.

| STEP | PULSE | LOGICAL OPERATION | REMARKS |
|---|---|---|---|
| 1 | SCE | → WORD COUNTER = 1<br>→ DIGIT COUNTER = 1 | START LOADING WORDS ONE & TWO INTO PRINT CONTROL & STORAGE REGISTER-30 |

FIG. 8.

| STEP | PULSE | LOGICAL OPERATION | REMARKS |
|---|---|---|---|
| 1 | SCE | → WORD COUNTER = 1<br>DIGIT COUNTER = 1 | LOAD WITHDRAWAL |
| 2 | WORD-1<br>DIGIT-6 | → WORD COUNTER = 2<br>DIGIT COUNTER = 3 | LOAD DEPOSITS |
| 3 | WORD-2<br>DIGIT-8 | → WORD COUNTER = 2<br>DIGIT COUNTER = 7 | LOAD BALANCE |
| 4 | WORD-2<br>DIGIT-2 | → WORD COUNTER = 2<br>DIGIT COUNTER = 9 | START LOADING WORD 2 DIGIT 9 |

FIG. 10.

| STEP | PULSE | LOGICAL OPERATION | REMARKS |
|---|---|---|---|
| 1 | SCE | → WORD COUNTER = 1<br>DIGIT COUNTER = 1 | LOAD WITHDRAWAL |
| 2 | WORD-1<br>DIGIT-6 | → WORD COUNTER = 2<br>DIGIT COUNTER = 3 | LOAD DEPOSITS |
| 3 | WORD-2<br>DIGIT-8 | → WORD COUNTER = 2<br>DIGIT COUNTER = 7 | LOAD BALANCE |
| 4 | WORD-2<br>DIGIT-8 | # | INSERT # SYMBOL AFTER DEPOSITS |
| 5 | WORD-2<br>DIGIT-2 | → WORD COUNTER = 2<br>DIGIT COUNTER = 9 | START LOADING WORD 2 DIGIT 9 |
| 6 | WORD-2<br>DIGIT-9 | CR EVEN<br>DB ODD | IF NUMBER IN BUFFER REGISTER IS EVEN CONVERT TO A CR SYMBOL. IF ODD CONVERT TO A DB SYMBOL |

FIG. 7.

| COLUMNS | 1 2 3 4 5 6 7 8 9 10 11 12 13 14 15 16 17 18 19 20 |
|---|---|
| | WITHDRAWALS  DEPOSITS  BALANCE |
| | 1 3 0 0 0 0 2 5 0 0 0 0 1 2 0 0 0 0 0 0 |

FIG. 9.

| WITHDRAWALS | DEPOSITS | BALANCE |
|---|---|---|
| 1 3 0 0 0 0 | 1 2 0 0 0 0 | 2 5 0 0 0 0 |

FIG. 11.

| WITHDRAWALS | DEPOSITS | BALANCE | CREDIT DEBIT |
|---|---|---|---|
| 1 3 0 0 0 0 | 1 2 0 0 0 0 | $ 2 5 0 0 0 0 | CR |

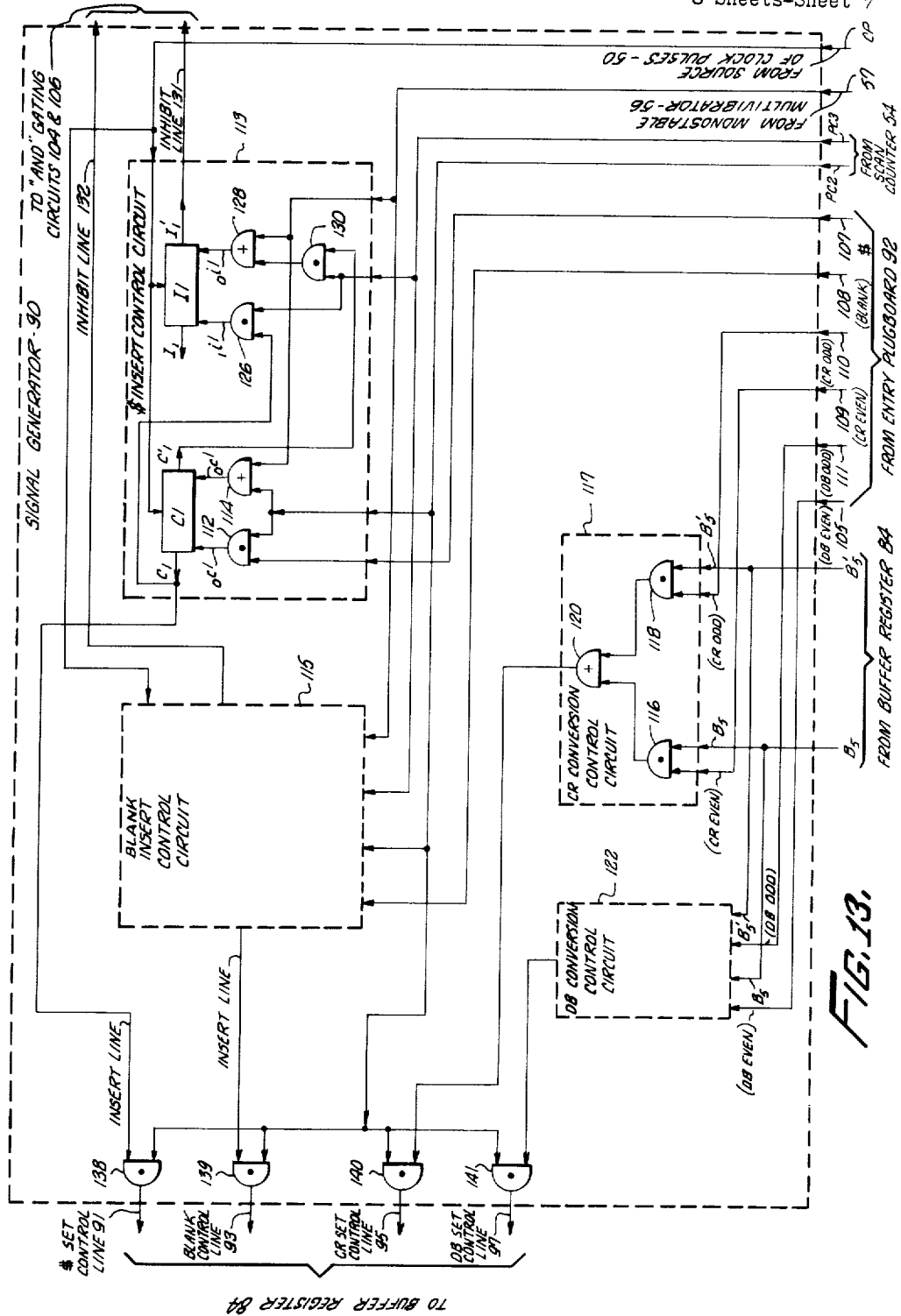

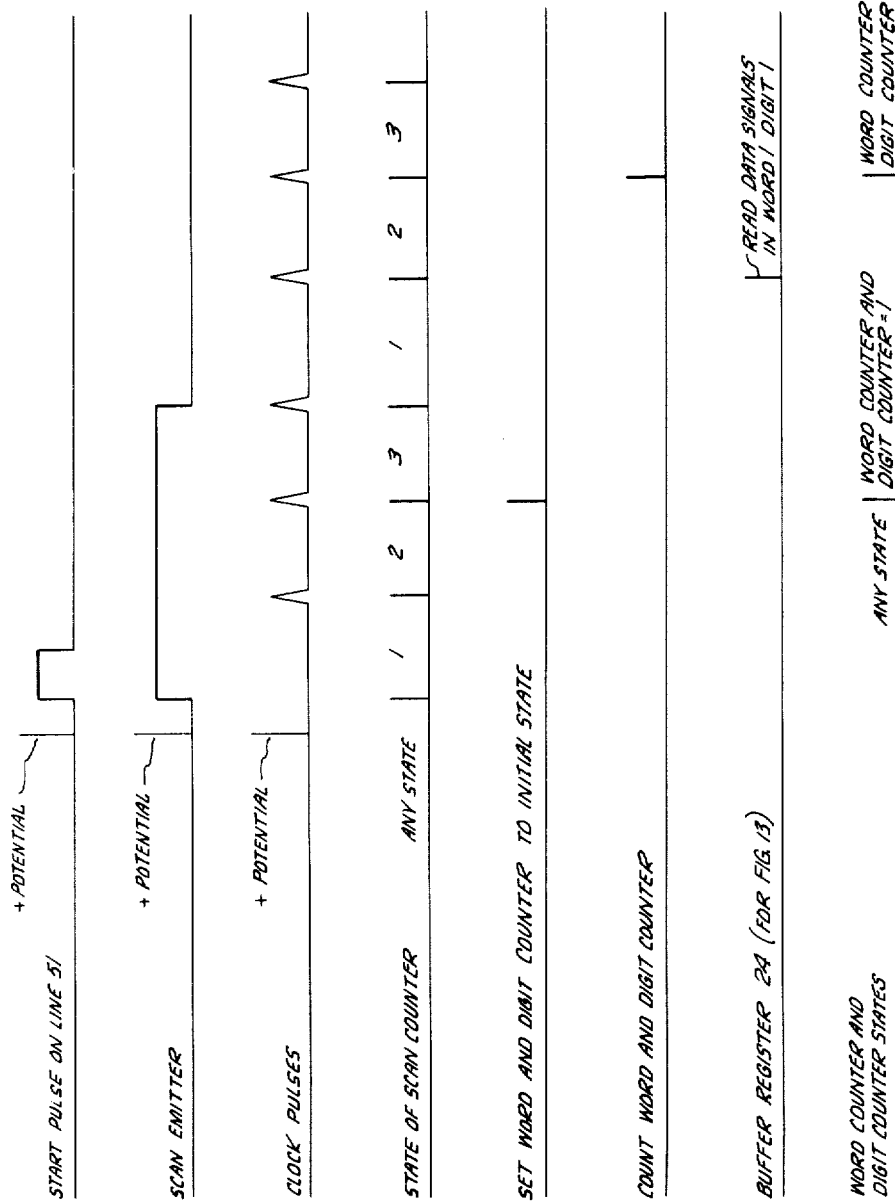

United States Patent Office 3,233,224
Patented Feb. 1, 1966

3,233,224
DATA PROCESSING SYSTEM
Jerry Flickwir Foster, Arcadia, Lawrence Le Roy Bewley, Covina, and James Russell Bennett, Glendora, Calif., and Edward L. Glaser, Newton Square, Pa., assignors to Burroughs Corporation, Detroit, Mich., a corporation of Michigan
Filed Sept. 15, 1960, Ser. No. 56,164
12 Claims. (Cl. 340—172.5)

This invention relates to digital computer systems and more particularly to high speed data processing systems.

Printing units have been used with data processors in which the information to be printed out is first edited by the data processors. One example is in a banking system in which signals representing dollar signs, credit symbols, blanks to be left on the page, etc. are inserted in among other data signals by the data processor prior to being shifted out by the data processor to a printing unit for printing. Typically, such an arrangement requires that a data processor waste valuable time in manipulating and editing data. Further, data processors are becoming much faster than the printing units which requires that the data processor do the editing operation and then wait for the slower speed printing unit to finish a printing cycle before shifting the edited data signals out to the printing unit. Not only is time wasted by the data processor but also valuable storage space is consumed by the program needed by the data processor to perform the editing operations.

In order to bring about a system balance and relieve the data processor of this data manipulation, a complete off-line editing system has been used. Such an editing system usually comprises a memory unit for storing data prior to being edited, a buffer register in which the editing operations take place and a timing unit for controlling the sequence of operations during the editing operation. A programing unit is provided for determining the sequence with which data signals are taken from the memory unit and for determining when other data signals not stored in the memory unit are to be inserted among the data signals stored in the memory unit or when data signals in the memory unit are to be converted to other data signals. Since the program may vary considerably depending on the desired editing, it is desirable to have a programing unit in which the program is easily changed. To this end plugboards have been used in which each step in the program is wired into the plugboard. Such a printing unit is then provided and coupled to the memory unit for receiving and printing out the edited data. Such an arrangement is generally undesirable since programs are long and it requires a great deal of equipment and time to wire each step of the program into the plugboards. Furthermore, it results in a mass of unwieldy plug wires. Such plugboard program units are shown and described in the book entitled Arithmetic Operations in Digital Computers, written by R. K. Richards and published by the D. Van Nostrand Company, Inc., on pages 320 to 326.

In contrast, the present invention provides an editing system utilizing programing by "exception" wherein the need for special print tapes is eliminated and the programer of the editing system is allowed to arrange information as desired for printing regardless of tape format. The invention provides for selective and conditional conversion which allows the programer to examine information and to convert it to other information. Insertions are also easily made. All these features are provided with the additional feature of a plugboard stored programing unit in which the wiring needed for programing is greatly reduced over that of previously existing editing systems.

An embodiment of the present invention provides an editing system for receiving data signals from a source of input signals such as a data processor and a tape unit, for editing the data signals and providing edited output signals for printing out by a printing unit. The editing system comprises a memory unit in which the input information is stored and a buffer register utilized for making insertions and conversions and for providing output signals to a print control and storage unit.

A programing unit including a counting circuit is connected to the memory unit and normally counts through a predetermined sequence of states. A program plugboard unit is provided in the programing unit having exit and entry hubs, or electrical connectors. Gating circuits couple output circuits of the counting circuit to the exit hubs for providing an output signal at the exit hubs corresponding to each state of the counting circuit. The entry hubs are connected through counter skip control circuits to input circuits of the counting circuits and when an entry hub is energized, the counting circuit skips intermediate steps to a state corresponding to the hub energized.

The counting circuit normally counts through a predetermined sequence of states addressing memory locations in the memory unit in a prescribed order corresponding to each state of the counting circuit to thereby cause the stored information in the memory unit to be shifted into the buffer register.

One form of editing is the rearranging of information prior to being entered into the buffer register. This is accomplished by interconnecting the exit hubs and the entry hubs to thereby cause the counter circuit to skip states. Thus, if the exit hub rendering an output signal at state five of the counter circuit is connected to an entry hub corresponding to a state ten input circuit of the counting circuit, the counting circuit will step from state five to ten rather than the normal step to state six, etc. Thus the programing unit comprises a novel circuit arrangement for operating according to programing by "exception" wherein the programing unit normally sequentially and continually steps through a predetermined sequence of steps. A modification of this sequence arises whenever the machine is programed to "except" this predetermined sequence. Such an arrangement allows data stored in the memory unit to be shifted into the buffer register, then to the printing unit, unaltered and automatically without the need of programing or wiring the plugboards. If the sequence with which information is read out of the memory unit is to be altered, it is done simply by inserting a wire between the appropriate exit and entry hubs on the plugboard. Whenever the sequential operation of the counting circuit is altered in response to the programed "exception," the intermediate steps are skipped and the counting circuit picks up at the programed new state and continues sequentially on from that point until another "exception" is programed or wired in.

A timing circuit is also provided for providing timing to the editing system. Two more sets of entry hubs or electrical connectors are provided which cooperate with the timing unit to provide another form of programing by "exception." In this form, programing by "exception" allows other data signals to be inserted into data signals stored in the memory unit and to be printed out. It also allows data signals stored in the buffer register to be conditionally converted to other data signals. Thus, whenever data signals representing characters such as a dollar sign, a blank, etc., are to be inserted in the data signals to be printed out, a wire is connected between the appropriate exit hub and hubs on an insert or conversion plugboard which causes the program to appropriately alter the normal sequence and insert or convert the signals.

A better understanding of the present invention may be had with reference to the following detailed description and the figures in which:

FIG. 6 is a typical written program, without any programed "exceptions" for the system of FIGS. 2 and 3.

FIG. 7 is a portion of a typical bank statement shown with the contents of the means for storing data signals shown in FIG. 5 printed out, without programed "exceptions," according to the program shown in FIG. 6;

FIG. 8 is a typical written program including programed "exceptions" for rearranging the stored data signals;

FIG. 9 is a portion of a typical bank statement shown with the contents of the means for storing data signals rearranged and printed out according to the program shown in FIG. 8;

FIG. 10 is a typical written program for rearranging, inserting and converting signals utilizing programing by "exception";

FIG. 11 is a portion of a typical bank statement with the contents of the means for storing data signals edited by the program shown in FIG. 10;

FIG. 13 is a signal generator for use in the editing system of FIG. 12; and

FIG. 14 is a wave shape and timing diagram of signals at designated points of the editing systems of FIGS. 3 and 12, during the beginning of the edit cycle.

Figure 1:
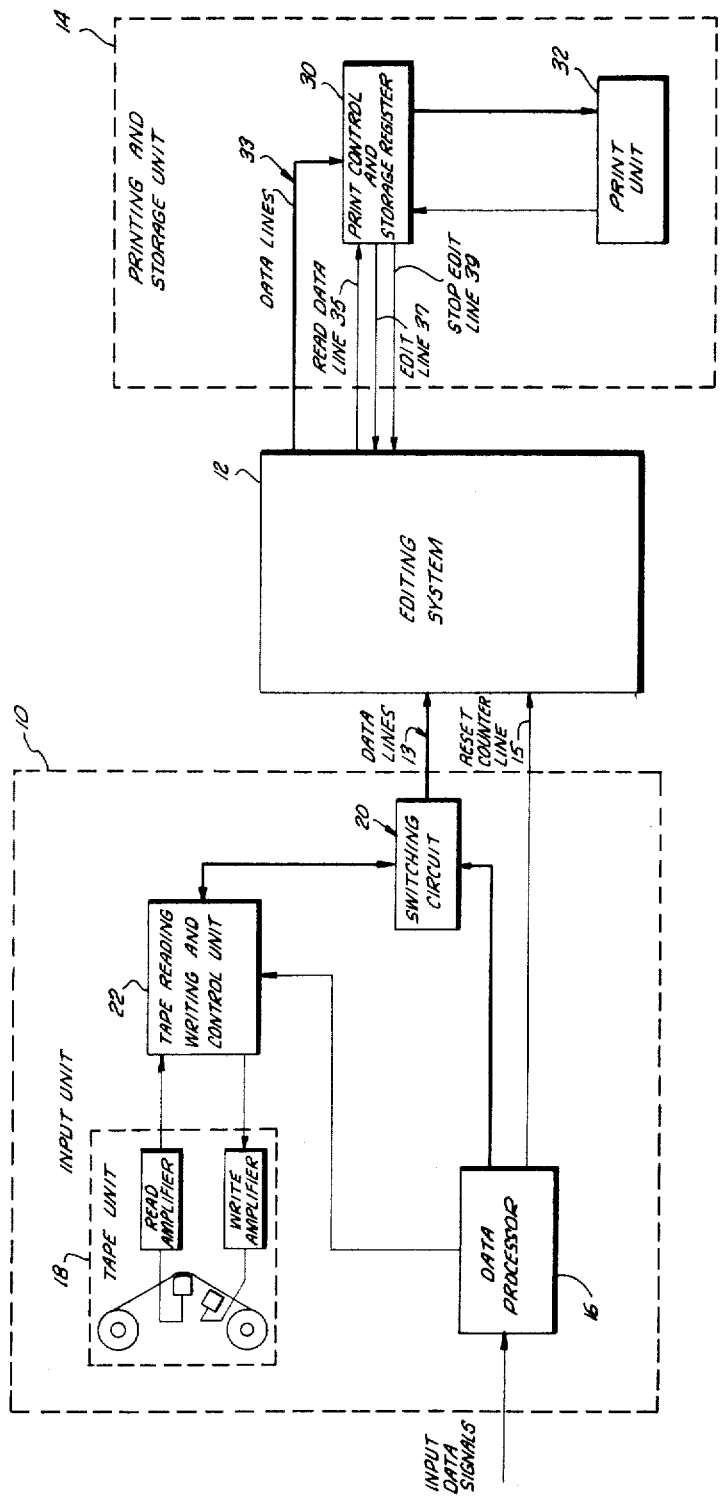
FIG. 1 is a block diagram of an input unit, editing system and a printing and storage unit embodying the present invention.

Referring now to the drawings and to FIG. 1 in particular, an input unit 10 is shown for providing data and control signals to an editing system 12. The editing system 12 has a novel circuit arrangement for editing data signals supplied by the input unit 10 and for providing edited data signals to a printing and storage unit 14, which then prints out characters represented by the edited data signals, on paper.

It should be noted that in the drawings the cables comprising a number of electrical lines or conductors are shown in heavy lines in order to distinguish them from a single electrical conductor or line.

The input unit 10 comprises a data processor 16 which may receive input data signals from punched paper tape, punched cards, magnetic tape, etc., and then perform predetermined calculations on the input data signals. After the calculations are performed the data processor 16 provides coded output data signals, in groups of five bits, which may either be shifted directly to the editing system 12 for a line operation of the printer 14 or shifted through a tape reading, writing and control circuit 22 onto tape in a tape unit 18 for off-line operation. Each group of five bits of data signals represent a character such as a number or a letter. After the groups of data signals are stored on the tape in the tape unit 18, they may be shifted out to the editing system 12 at a later time. The connections between the data processor 16, the tape unit 18 and the editing system 12 are made through a switching circuit 20. The operations of the switching circuit 20 and the tape reading, writing and control unit 22 are controlled by the data processor 16.

Data lines 13 and a reset counter line 15 connect output circuits of the data processor 16 to input circuits of the editing data system 12. It is on the data lines 13 that the groups of data signals from the tape unit 18 and the data processor 16 are applied by the switching circuit 20.

The editing system 12 has output circuits connected to input circuits of the printing and storage unit 14, by data lines 33 and a read data line 35. Also output circuits of the printing and storage unit 16 are connected to input circuits of the editing system 12 by an edit line 37 and a stop edit line 39. After the groups of data signals have been transferred from the input unit 10 to the editing system 12, the editing system 12 is then switched into an edit cycle either by a high potential signal on the edit line 39 or by actuating a switch in the editing system, as will be explained more fully hereinafter. During the edit cycle the groups of data signals stored in the editing system 12 are edited by "exception" in a novel circuit arrangement utilizing a stored program. After a group of data signals is edited the signals are applied to the data lines 33 for reading by the printing and storage unit 14.

The printing and storage unit 14 has a print control and storage register 30, which is connected to a print unit 32. The print control and storage register 30 has a storage register (not shown) responsive to a high potential signal on the read data lines 35 to read and store the group of edited data signals applied to the data lines 33 by the editing system 12. When enough groups of data signals are read by the storage register in the print control and storage register 30 to fill it, the print control and storage register 30 applies a high potential signal to the stop edit line 39. The editing system 12 is responsive to the high potential signal on the stop edit line 39 to stop editing the groups of data signals and applying them to the data lines 33. After the high potential signal is applied to the stop edit line 39, the printing and storage unit 14 goes into a printing cycle during which the characters, represented by the groups of data signals stored in the print control and storage register 30, are printed out by the print unit 32. It should be noted that the order in which the groups of data signals are shifted into the print control and storage register 30 is the order in which the characters, represented by the groups of data signals, will be printed out by the print unit 32.

Figure 2:
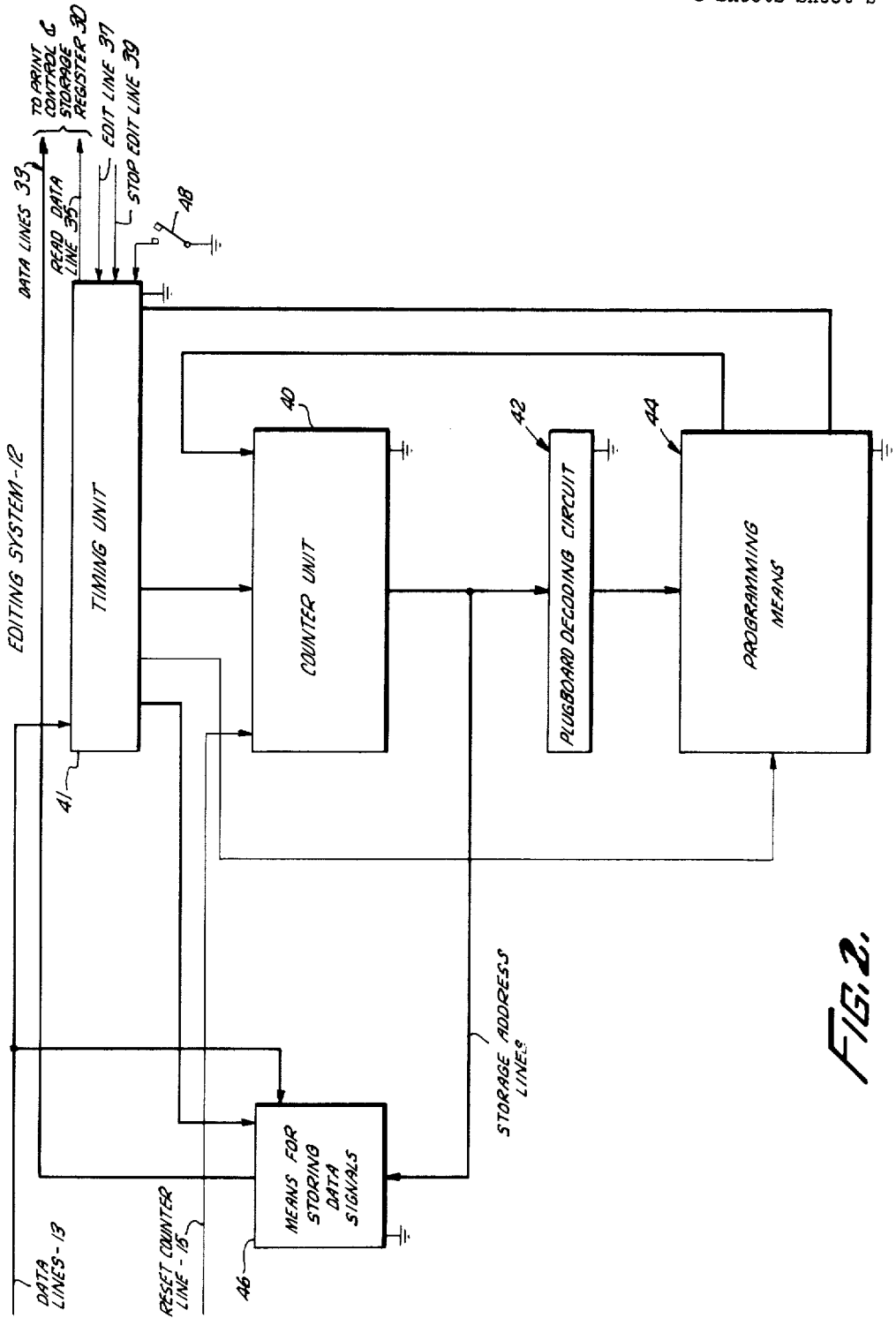
FIG. 2 is a general block diagram of the editing system of FIG. 1 and embodying the present invention.

FIG. 2 is a general block diagram of an editing system 12 useful for describing the general operation of the invention.

A counter unit 40 is provided having input circuits connected to output circuits of a timing unit 41 and a programing means 44. The output circuits of the counter unit 40 are connected to input circuits of a plug board decoding circuit 42 and a means for storing data signals 47. The counter unit 40 is responsive to a high potential signal on the reset counter line 15 to be reset to an initial state. The counter unit 40 is also responsive to timing pulses from the timing unit 41 to count through sequential states of operation. For each state of operation the counter unit 40 develops a digital binary coded output signal characteristic of its operating state which is applied to the input circuit of the plugboard decoding circuit 42 and the input circuit of the means for storing data signals 46.

The plugboard decoding circuit 42 has an output circuit with a plurality of output lines which are connected to an input circuit of a programing means 44. The plugboard decoding circuit 42 is responsive to each binary coded output signal of the counter unit 40 to provide a unique digital signal on one out of its plurality of output lines corresponding to the operating state of the counter 40.

The means for storing data signals 46 has other input circuits connected to the data lines 13, and the timing unit 41. An output circuit of means for storing data signals is connected to the data lines 33, which are connected to the print control and storage register 30. The means for storing data signals 46 contains a plurality of storage locations, each arranged for storing five bits of binary coded information and therefore one group of data signals applied to the line 13.

The means for storing data signals 46 is responsive to a predetermined signal from the timing unit 41 to store a group of data signals applied to the line 13. The storage location in which the group of data signals are to be stored is specified by address signals from the counter unit 40. The means for storing data signals 46 is also responsive to another output signal of the timing unit 41 for shifting out signals from the storage location specified by the address signals from the counter unit 40, and to apply the group of data signals to the data line 33. When a group of data signals is shifted from the input unit 10 and stored in the editing system 12, called the load cycle, this group of data signals is first applied to the data lines 13. Simultaneously, digital coded address signals are applied to the means for storing data signals, by the counter unit 40, corresponding to a storage location in the means for storing data signals 46 where the group of data signals is to be stored. The timing unit 41 then provides a signal to the means for storing data signals 46 causing it to store the group of data signals on the lines 13 in the addressed storage location. The means for storing data signals 46 is also responsive to a predetermined timing signal from the timing unit 41 to shift out a group of data signals from a storage location, specified by the address signals from the counter unit 40 and to apply this group of data signals to the data lines 33.

The timing unit 41 has input circuits connected to the edit line 37, the stop edit line 39, the data lines 13, the programing means 44 and through the normally open contacts of a switch 48 to ground (0 volt) potential. An output circuit of the timing unit 41 is also connected to the read data line 35, which is connected to an input circuit of the print control and storage register 30 and the programing means 44.

Consider now the operation of the editing system 12 with the programing means 44 removed from the circuit. During the load cycle a high potential signal is first applied to the reset counter line 15, which causes the counter to be set to its initial state. The first group of data signals applied to the data lines 13 cause the timing unit 41 to develop a predetermined signal at the input circuit of the means for storing data signals 46. This signal causes the group of data signals, on the data lines 13, to be read and stored in the storage location specified by the address signals from the counter unit 40. The timing unit 41 then counts the counter unit 40 up one state from the last state. Thus each time a new group of data signals are stored in the counter unit 40, it counts up one state, and the storage locations in the means for storing data signals 46 are provided with groups of data signals for storage in a prescribed order. This continues until all storage locations in the means for storing data signals 46 have been filled.

Assume now that it is desired to switch the editing system 12 into an edit cycle. The switch 48 is actuated causing the timing unit 41 to start providing timing pulses to the counter unit 40. Responsive to the timing pulses, the counter unit 40 sequentially counts through a predetermined sequence of states. In each state of the counter unit 40 an address signal is provided to the means for storing data signals 46. The timing unit 41 also provides a timing pulse to the means for storing data signals 46 which causes it to provide a group of data signals on the data lines 33 from the addressed storage location.

The programing means 44 may be an electrically controlled storage unit such as a core memory unit or a diode matrix. However, in a preferred embodiment the programing means 44 comprises a plurality of plugboards having hubs or electrical connectors for interconnecting lead wires to provide the stored program. The programing means 44 is programed to be responsive to predetermined signals from the plugboard decoding circuit 42 to provide output signals to the counter unit 40 and the timing unit 41. The timing unit 41 is responsive to the output signals of the programing means 44 to introduce "exceptions" into the above sequential operation of the editing system 12.

One "exception" which is introduced by the programing means 44 is the rearrangement of a group or groups of data signals in the means for storing data signals 46 during the editing cycle. When programed for this "exception," the programing means 44 is responsive to a programed output signal of plugboard decoding circuit 42 to provide a timing signal to the input circuit of the counter unit 40. Whenever the programing means 44 provides this timing signal to the input of the counter unit 40, the counter unit 40 does not go to its next sequential state of operation but jumps to a state corresponding to the output signal from the programing means 44. This not only causes the counter unit 40 to skip intermediate states but to skip data signals in intermediate storage locations of the means for storing data signals 46. This allows the sequence of data signals stored in the means for storing data signals 46 to be rearranged and shifted out to the print control and storage register 30 in any desired sequence. It should be noted that such a program arrangement allows the beginning of groups of data signals to be selected, then, without further programing the editing system 12 sequentially shifts these the groups of data. When the end of the groups is reached another "exception" may be introduced, similar to that described above, and cause the beginning of still other groups of data signals to be selected and then shifted out to the print control and storage register 30. Whenever data signals are applied to the data lines 33, which are to be read and stored by the print control and storage register 30, the timing unit 41 provides a high potential output signal on the read data line 35.

Another "exception" which is introduced by the programing means 44 is the insertion of a group of data signals representing a character. This is done by inserting the desired group of data signals in between other groups of data signals as they are shifted out to the print control and storage register 30. Usually the groups of data signals stored in the means for storing data signals 46 contain signals representing numbers and alphanumeric characters but are normally absent such characters as dollar signs, periods, commas, etc., and are absent signals for causing the print unit 32 to skip spaces in between words. By "exception" groups of data signals representing the above characters and spaces are introduced into the groups of data signals as shifted out to the print control and storage register 30.

Consider now the operation of the editing system 12 when an insert by "exception" is to be made. First a predetermined program is stored in the programing means 44. The program is arranged so that the programing means 44 will develop on insert output signal to the timing unit 41 when the state of the counter unit 40 corresponds to the storage location in the means for storing data signals 46 which contains the group of data signals to be shifted out just prior to the group of data signals to be inserted. This causes the timing unit 41 to stop the counting of the counter unit 40 and causes the timing unit 41 to provide an insert signal to the means for storing data signals 46. The insert signal causes the means for storing data signals 46 to develop a group of data signals on the data lines 33 corresponding to the character to be inserted. The timing unit 41 then develops a high potential output signal on the read data line 35 to cause the print control and storage register 30 to read the inserted group of data signals applied on the data lines 33. After the group of data signals is inserted and the timing unit 41 causes the next group of data signals to be shifted out and causes the counter unit 40 to start counting, the counter unit 40 then sequentially continues its counting operations until another "exception" is introduced by the stored program.

Another "exception" which may be introduced by the programing means 44 is the conversion of a group of data signals to another group of data signals. Normally a group of data signals stored in the means for storing data signals 46 is shifted out and applied unaltered to the data lines 33 for reading by the print control and storage register 30. However, by the introduction of a predetermined program in the programing means 44 data signals stored in the means for storing data signals may be converted to other characters such as a "CR" symbol or a "DB" symbol. Conversion by "exception" may also be done conditionally, that is, the group of data signals corresponding to the character to be converted may be conditionally converted to groups of data symbols representing another character. The condition may be, for example, whether the group of data signals to be converted is even or odd.

Consider now the operation of the editing system 12 when the programing means 44 is programed to convert by "exception." The counting unit 40 normally sequentially counts through its states of operation causing groups of data signals to be shifted out and applied to the data lines 33. When the counter unit 40 is in the state representing the storage location of the group of data signals to be converted, the stored conversion program causes a conversion signal to be applied to the timing unit 41. If the group of data signals in the addressed storage location meet the condition, i.e. odd or even, the timing unit 41 applies a convert signal to the means for storing data signals 46. This causes the means for storing data signals 46 to convert the addressed group of data signals to the desired group of data signals and apply them to the data lines 33.

With the general description of FIG. 2 in mind, a detailed description will be given of the editing system 12 shown in FIG. 3 wherein the "exception" of rearranging the groups of data data signals stored in the means for storing data signals 46 is shown and described.

The timing unit 41 comprises a source of clock pulses 50, which provides timing pulses for synchronizing the operation of the editing system 12. The source of clock pulses 50 has two input circuits one of which is connected to a start line 51 while the other input circuit is connected to the stop edit line 39. The source of clock pulses 50 also has an output circuit designated CP. The source of clock pulses 50 is always responsive to a high potential signal on the start line 51 to begin developing high potential, recurring pulses of potential at the output circuit CP. These pulses of potential will be referred to as clock pulses. The source of clock pulses 25 is also responsive to a high potential signal on the stop edit line 39 to immediately stop developing the clock pulses at the output circuit CP.

A start pulse generator 52 is also provided in the timing unit 41 and has two input circuits which are connected to the edit line 37, and to the normally open edit switch 48. The start pulse generator 52 has an output circuit connected to the start line 51 and develops a single high potential pulse of potential at its output circuit whenever the normally open edit switch 48 is actuated or a high potential signal is applied to the edit line 37.

The timing unit 41 also comprises a scan counter 54. The scan counter 54 has two input circuits, one of which is connected to the CP output circuit of the source of clock pulses 50 and the other one is connected to the start line 51. The scan counter 54 has three output circuits designated by the symbols PC1, PC2 and PC3. The scan counter 54 has three states of operation called states one, two and three during which high potential output signals are developed at the output circuits PC1, PC2 and PC3, respectively. The scan counter 27 is essentially a ring counter which is responsive to each clock pulse signal to step into another state of operation going through its states in the following order: state one, state two and state three and then back to state one. The scan counter 54 is also responsive to a high potential signal on the start line 51 to be reset, immediately jumping into state one, regardless of its present state independent of clock pulses.

A monostable multivibrator 56 is provided in the timing unit 41. The monostable multivibrator 56 has an input circuit connected to the start line 51 and two output circuits connected to lines 57 and 58. The monostable multivibrator 56 will be referred to as having two states of operation, a false state and a true state. When the monostable multivibrator is in a false state, a high potential output signal will always be provided on the line 53 and a low potential on the line 57. When the monostable multivibrator 56 is in true state, a high potential output signal will always be provided on the output line 57 and a low potential on the line 58. Normally the monostable multivibrator is in a false state, but when a high potential signal is received on the start line 51, it is responsive thereto to go into a true state of operation. When in a true state, the monostable multivibrator 56 stays in a true state of operation for the length of time it takes for the scan counter 54 to go through states one, two and three and back to state one, and then it goes to a false state again and stays there until it receives another high potential input signal.

The timing unit 41 also comprises an "and" gating circuit 60 which has two input circuits. One input circuit of the "and" gating circuit 60 is connected to the PC3 output circuit of the scan counter 54 and the other input circuit is connected to the output line 58 of the monostable multivibrator 56. An output circuit of the "and" gating circuit 60 is connected to the read data line 35. The "and" gating circuit 60 provides a high potential output signal on the read data line 35 only when a high potential input signal is received at both of its input circuits, that is when the scan counter 54 is in state three and the monostable multivibrator 56 is false.

The counter unit 40 also comprises two counters 62 and 64 with associated control circuits. The counter 62 is called a word counter and comprises eight flip-flop circuits designated F1 through F8 for providing ninety-nine unique combinations of states of operation and thus digital binary coded output signals. The word counter 62 has a skip control input circuit connected to the output circuit of a counter skip control circuit 66 and a count control input circuit connected to the output circuit of an "or" gating circuit 67. The word counter 62 normally counts one state in response to each high potential signal from the "or" gating circuit 67, counting sequentially from a state one up to a state ninety-nine. A high potential output signal from the "or" gating circuit 67, when the word counter 62 is in state ninety-nine, causes it to recycle to the state one and repeat the cycle of operation.

The counter 64 is a digit counter and is similar to the word counter 62, however, it only has ten unique states of operation, called states one through ten. The digit counter 64 comprises four flip-flop circuits designated F9 through F12, and has a skip control input circuit connected to an output circuit of a counter skip control circuit 70. Another input circuit, called the count input circuit is connected to an output circuit of an "or" gating circuit 71. The digit counter 64 also normally, sequentially counts through its states one through ten and then recycles to state one, doing so in response to each high potential signal at the output circuit of the "or" gating circuit 71. The digit counting circuit 64 has an output circuit connected to a line 74 and each time the digit counter 64 counts into state ten, a high potential output signal is provided thereon.

The control circuit 66 has input circuits connected to a plug board 76 of the means for programing 44, the output circuit PC2 of the scan counter 54, the CP output circuit of the source of clock pulses 50 and the reset line 15. The counter skip control circuit 66 comprises gating circuits for resetting the word counter 62 to any of its possible operating states in response to coded input signals from the plugboard 76 and the coincidence of a high potential signal at the output circuit PC2 of the scan counter 54 and a clock pulse. The coded signals from the plugboard 76 determine the state the word counter 62 is to be set into. Whenever a high potential signal is developed on the reset line 15 the counter skip control circuit 66 resets the word counter 62 to its state one.

The counter skip control circuit 70 is similar to the control circuit 66 and has input circuits connected to the plug board 76 the output circuit PC2 of the scan counter 54, the CP output circuit of the source of clock pulses 50 and the reset line 15. The counter skip control circuit 70 also comprises gating circuits for resetting the digit counter 64 to any one of its possible states depending on the coded signals applied to its input circuits by the plugboard 76 in coincidence with a high potential signal at the output circuit PC2 of the scan counter 54 and a clock pulse. The counter skip control circuit 70 is also responsive to a high potential signal on the reset line 15 to reset the digit counter circuit 64 to state one.

The "or" gating circuit 67 has two input circuits one input circuit is connected to an "and" gating circuit 69 and the other is connected to the output circuit of an "and" gating circuit 69. The "and" gating circuit 68 has three input circuits, which are connected to the output circuit PC2 of the scan counter 54, the output circuit CP of the source of clock pulses 50 and the line 72. Thus the "or" gating circuit 67 will apply a high potential input to the word counter 62 causing it to count from one state to the next whenever the scan counter 54 is in state two, the digit counter 64 is in state 10 and there is a clock pulse or whenever there is a high potential output signal from the "and" gating circuit 69. The "and" circuit 69 has two input circuits. One input circuit is connected to the line 72 and the other is connected to the output circuit of a delay circuit 73. The delay circuit 73 has an input circuit connected to the output circuit of an "or" gating circuit 75. The "or" gating circuit 75 has input circuits connected to the data lines 13. Whenever there is a group of data signals on the data lines 13, at least one line will be a high potential signal. Thus the "or" gating circuit will develop a high potential output signal whenever a group of data signals are applied to the lines 13. The delay circuit 73 is responsive to the rising edge of the high potential output signal of the "or" gating circuit 75 to provide an output signal after a delay long enough to store signals in the means for storing data signals 46.

Thus it is seen that the signal on the lines 13 must all drop to a low potential and then have the group of data signals applied thereto. The "or" gating circuit 71 has two input circuits, which are connected to the output circuit of an "and" gating circuit 72 and the output circuit of the delay circuit 73. The "and" gating circuit 72 has two input circuits which are connected to the output circuit PC2 of the scan counter 54 and the output circuit CP of the source of clock pulses 50. The "or" gating circuit 71 will provide a high potential output signal and cause the digit counter 64 to count from one state to the next whenever the scan counter 54 is in state two and a clock pulse is received or whenever a new data signal is received on the data lines 13.

Figure 5:
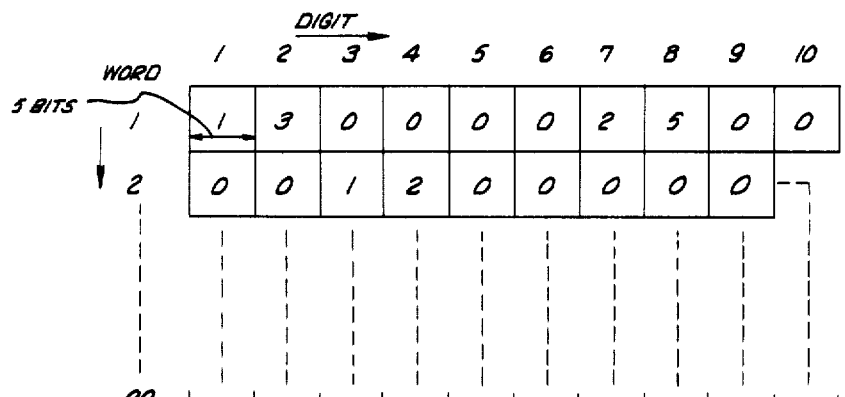
FIG. 5 is an illustrative drawing of storage locations in the means for storing data signals of FIGS. 3 and 13 with the contents thereof shown.

The means for storing data signals 46 has an input circuit connected ot the PC1 output circuit of the scan counter 54 and has another input circuit connected to the output circuits of the word counter 62 and the digit counter 64. The word counter 62 and the digit counter 64 provide storage address signals to the means for storing data signals 46. Each combination of states of the word counter 62 and the digit counter 64 correspond to a particular storage location in the means for storing data signals 46. Whenever a high potential output signal is applied to the PC1 output circuit of the scan counter 54, it causes the storage location specified by the states of the word counter 62 and the digit counter 64 to be addressed and the group of data signals stored in this storage location to be applied to the data lines 33. The group of data signals on the data lines 33 remain thereon until after a new storage location is addressed. The means for storing data signals 46 also has an input circuit connected to the output circuit of the "or" gating circuit 75. Whenever a high potential output signal is received from the "or" gating circuit 75, the means for storing data signals 46 reads and stores the group of data signals on the data lines 13. The means for storing data signals 46 has ninety-nine words of storage space and ten digits of storage space within each word. Each digit of storage has five binary bits of storage space for storing one group of data signals. FIG. 5 is an illustrative drawing showing the words and digits of storage space.

The plugboard decoding circuit 42 is connected to the output circuits of the word counter 62 and the digit counter 64, and provides a high potential output signal at one out of nine hundred ninety output circuits corresponding to each possible combination of states of the word counter 62 and the digit counter 64. For purposes of illustration, the output lines from the plugboard decoding circuit 62 are shown divided into groups of words numbered 1 through 99 and within each group of words ten lines numbered D1 through D10, which, to be explained, represent, the word and digit signal storage locations within the means for storing data signals 46.

The programing means 44 comprises an exit plugboard 78 and the entry plugboard 76 having electrical wire hubs or wire connectors indicated by the general symbol 80. The exit plug board 78 has nine hundred ninety hubs 80 arranged in horizontal rows and vertical columns, corresponding to the words and digits of storage space in the means for storing data signal 46. Thus, there are ninety-nine rows of hubs numbered 1 through 99 corresponding to the words of storage space one through ninety-nine and corresponding to each word there are ten hubs numbered 1 through 10 corresponding to the ten digits of storage within each word. The output circuits of the plugboard decoding circuit 42 are connected by the lines labeled by words and digits to the corresponding hubs on the exit plugboard 78. Thus the line labeled word 1, digit 1 of the plug board decoding circuit 42 is connected to the word 1, digit 1 hub on the exit plugboard 78. Similarly, the lines labeled word 1, digit 2 of the plugboard decoding circuit 22 is connected to the word 1, digit 2 hub on the exit plugboard 78, etc. Thus it is seen that for each combination of states of the word counter 62 and the digit counter 64 a high potential signal will be developed at one of the hubs 80 on the exit plugboard 78. A scan emitter hub is also provided on the exit plugboard 78, and is connected to the line 57, which is connected to the output circuit of the monostable multivibrator 56 to control the resetting of the word and digit counters 62 and 64, respectively, by means of the plugboard 76.

The entry plugboard 76 also has rows and columns of hubs 80. Two columns of hubs 80 are provided for designating the tens digit and the units digit of a word of storage space in the means for storing data signals 46. A third column is provided for designating the digits within the words. In the tens column for designating the word, there are two hubs in each row, and similarly for the units column. The rows in the tens column are numbered 10 through 90 in increments of ten and the rows in the units column are numbered 1 through 9 in increments of one. There are also two hubs in each row in the digit column and the rows are numbered 1 through 10 in increments of one. To be explained, it takes a connection from a hub in the exit plugboard 78 to one hub in the tens column and/or one hub in the units column to designate a word of storage location on the means for storing data signals 46. It also takes a connection from the exit plugboard 78 to a single hub in the digit column to designate a digit within the word. The hubs in the tens, units and digits columns are connected to input circuit of isolation circuits 79, 81 and 83, respectively. The output circuits of the isolation circuits 78 and 81 are connected to the input circuits of the skip control circuit 66 and the output circuit of the isolation circuit 83 is connected to the input circuit of the counter skip control circuit 70. The isolation circuits prevent a high potential signal at one 9 hub in a row in each column from developing a high potential signal at the other hub in that same row and column.

Figure 4:
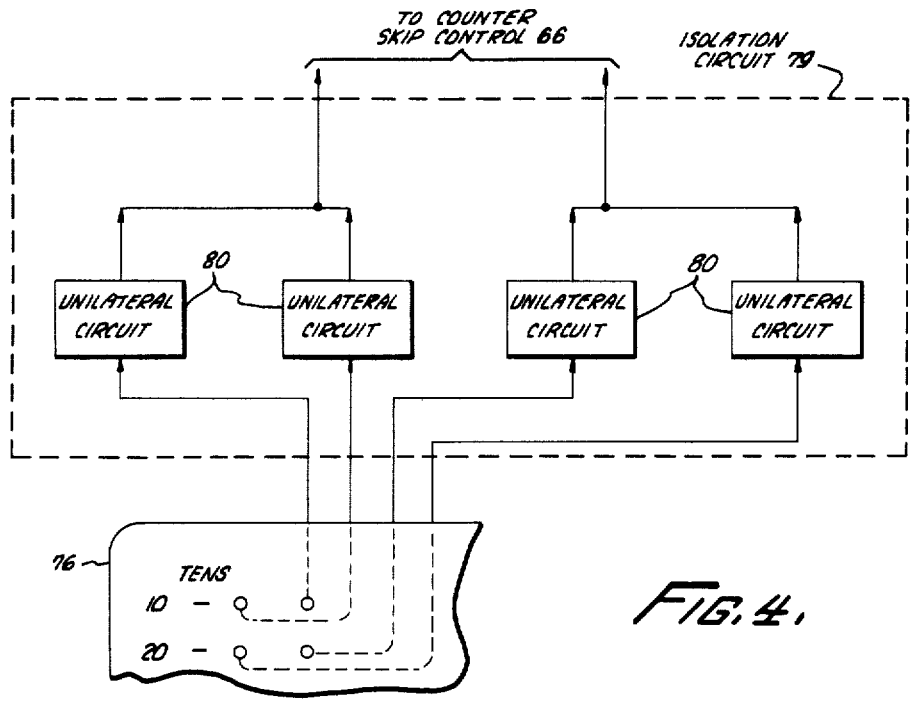
FIG. 4 is a block diagram of an isolation circuit for use in the editing system of FIG. 3.

Referring to FIG. 4, the isolation circuit 79 contains unilateral circuits 80 which allow signals to pass through in one direction and not the other. In the tens column, row 10 of hubs are connected to input circuits of two unilateral circuits 80. The output circuits of the two isolation circuits 80 are connected together to a common output line which is connected to the skip control circuit 66. Thus the unilateral circuits 82 allow signals to pass from the hubs to the common output line to the skip control circuit 66 but block signals from the common output line back to the hubs. Each of the other rows of hubs in the tens column are connected in pairs to similar unilateral circuits in the isolation circuit 74. Similarly, each row of hubs in the units column and digits column are connected in pairs to unilateral circuits in the isolation circuits 81 and 83, respectively.

The skip control circuit 66 is responsive to a high potential signal at a hub in the tens and/or units column, simultaneously with high potential signal at the output circuit PC2 of the scan counter 54 and a clock pulse to set the word counter 62 to a state corresponding to the hubs receiving the high potential signal. Thus the control circuit 66 will set the word counter 62 to state one if a high potential signal is applied to a units hub 1, but will set it to state eleven if a high potential signal is applied to both a tens hub 10 and a units hub 1. Similarly, the word counter 66 will be set to state ninety if a high potential is applied to a tens hub 90 above, but will be set to state ninety-nine if a high potential signal is applied to both a tens hub 90 and a units hub 9. Similarly, the control circuit 70 is responsive to a high potential signal at one of the digit hubs simultaneously with a clock pulse and a high potential signal at the output circuit PC2 of the scan counter 54 to set the digit counter 64 to the corresponding state.

With the specific structure of FIG. 3 in mind, an example will be given illustrating its operation. Since the printing system shown in FIG. 1 has been used in a banking system wherein information is to be printed out on bank statements, the following example illustrates its operation in such a system.

Assume that the banking business in which the editing system 12 is to be used has preprinted statements such as that shown in FIG. 7 upon which information is to be printed by the print unit 32. The bank statement shown in FIG. 7 is arranged in three sections providing for withdrawals, deposits and for a balance. Each of the sections is divided into six columns. Thus, columns 1 through 6 are for withdrawals, columns 7 through 12 are for deposits and columns 13 through 18 are for the balance. The print control and storage register 30 prints out information a character at a time doing so in the same order in which the groups of data signals representing the characters are received from the editing system 12. Thus it is seen that the bank statement of FIG. 6 will be printed out a character at a time from left to right in the columns 1 through 18.

Figure 3:
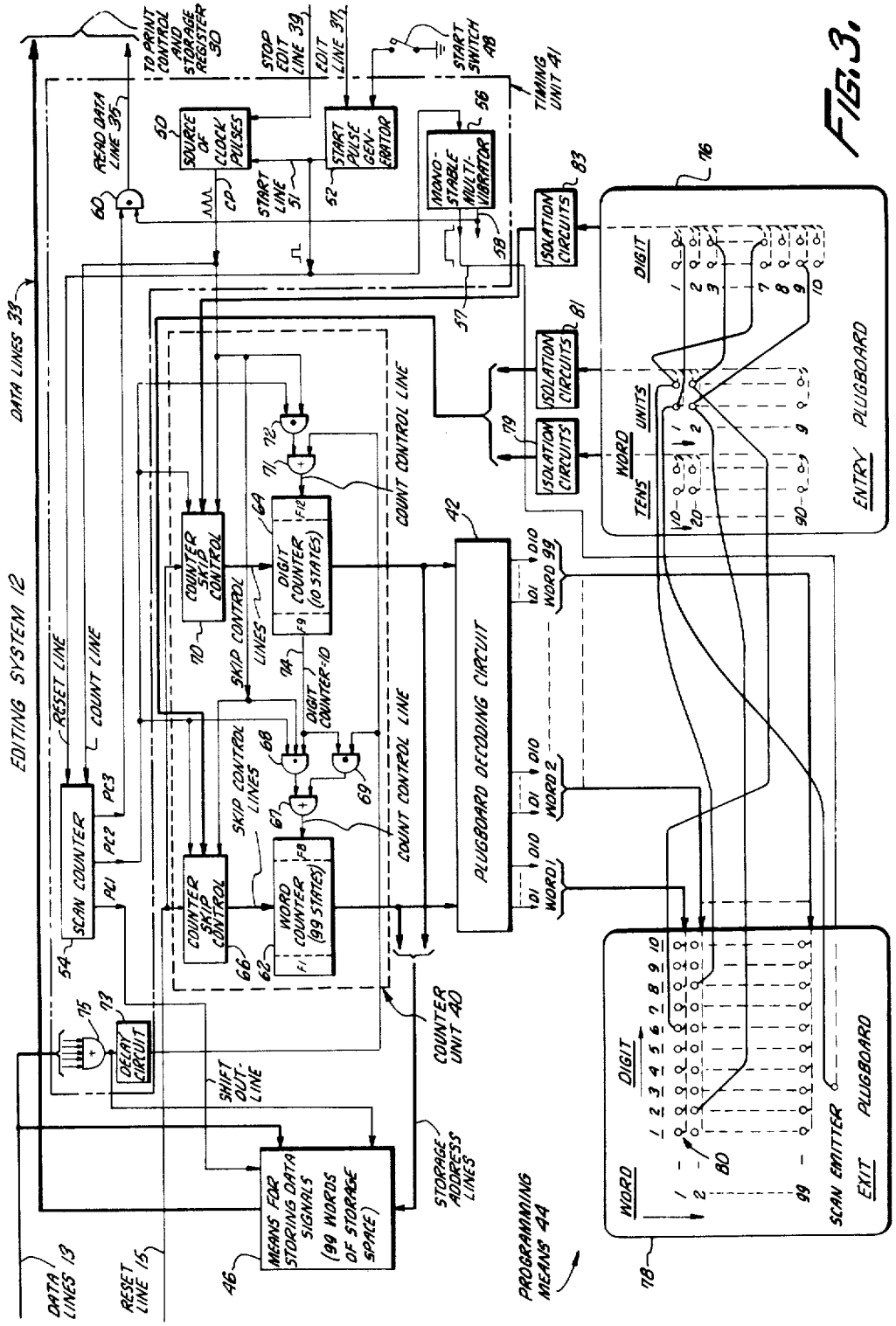
FIG. 3 is a specific schematic diagram, partly in block form, of a form of the editing system shown in FIG. 2.

A better understanding of the editing system 12 of FIG. 3 may be had with reference to FIG. 14 and the following examples of the operation thereof. Assume now that data signals are stored in the means for storing data signals 46 and that the groups of data signals stored in each of the word and digit storage locations represent the character numbers shown in FIG. 5. Also assume that the only wires connected between the hubs on the exit plugboard 78 and the hubs on the entry plugboard 76 of FIG. 3 are those connected between the scan emitter of the exit plugboard 78 and a units hub 1 and a digit hub 1 on the entry plugboard 76. FIG. 14 shows wave shapes at designated points in the editing system of FIG. 3 during the time the editing system 12 is initially started into an edit cycle. First, the start switch 48 is actuated which causes the start pulse generator 52 to provide a high potential pulse on the start line 51. The pulse on the start line 51 causes the scan counter 54 to be reset to state one, the monostable multivibrator 56 to be triggered into a true state and the source of clock pulses 50 to start developing clock pulse signals at its output circuit CP.

During state one of the scan counter 54, the first time the means for storing data signals 46 is addressed by the output signals from the word counter 62 and the digit counter 64, an output signal corresponding to the group of data signals stored in the addressed storage location is applied to the data lines 33. It should be noted that the word counter 62 and the digit counter 64 may initially be in any state, and therefore the group of data signals in the addressed storage location is not to be read by the print control and storage register 30. The clock pulse signal at the end of state one of the scan counter 54 triggers it into state two. During state two of the scan counter 54, a high potential signal is applied at the output circuit PC2 of the scan counter 54 and also a high potential signal is applied at the scan emitter by the monostable multivibrator 56. Thus a high potential signal is applied to the units hub 1 and the digit hub 1 on the entry plugboard 76. The clock pulse signal at the end of state two causes the counter skip control circuits 66 and 70 to set the word counter 62 and the digit counter 64 into state one and counts the scan counter 54 into state three. Since the monostable multivibrator 56 is still true, the output signal of the "and" gating circuit 60 at the read data line 35 is a low potential signal. Therefore the print control and storage register 30 does not read the group of data signals on the data lines 33. The clock pulse signal at the end of state three of the scan counter 54 places it back into state one and shortly thereafter the monostable multivibrator 56 goes into a false state.

During state one of the scan counter 54, the second time a high potential signal is provided at the output circuit PC1, the word 1, digit 1 storage location of the means for storing data signals 46 is addressed. A group of data signals are then provided on the data lines 33 corresponding to those in the addressed storage location which is the numeral 1 (see FIG. 5). The clock pulse signal at the end of state one of the scan counter 54 places it into state two. The clock pulse signal at the end of state two places the scan counter 54 into state three and places the digit counter 64 into state two. During state three of the scan counter 54, the group of data signals stored in the word 1, digit 1 storage location of the means for storing data signals 46 is still applied to the data lines 33 and the "and" gating circuit 60 provides a high potential output signal at the read data line 35. This causes the print control and storage register 30 to read the group of data signals representing a number 1 on the data lines 33. The clock pulse signal at the end of state three places the scan counter 54 into state one.

During state one of the scan counter 54, the third time, the word counter 62 and the digit counter 64 are in states one and two, respectively. The word 1, digit 2 storage location of the means for storing data signals 46 is addressed causing a group of data signals representing the numeral 3 to be applied to the data lines 33. The clock pulse signal at the end of state one causes the scan counter 54 to count into state two. The clock pulse signal at the end of state two of the scan counter 54 counts the digit counter 64 and the scan counter 54 into state three. During state three of the scan counter 54 the group of data signals representing a character number 3 is still applied to the data lines 33 and the "and" gating circuit 60 provides a high potential output signal at the read data line 35. This causes the print control and storage register 30 to read the group of data signal on the data lines 33.

In summary then, with the above assumed program or wire connections, during each state one, the storage location of the means for storing data signals 46, corresponding to the states of the word counter 62 and the digit counter 64 will be addressed. This causes a group of data signals to be applied on the data lines 33 corresponding to those stored in the addressed storage location. During each state two of the scan counter 54 the digit counter 64 will be counted into its next state. During each state three the group of data signals applied on the data lines 33 will be read by the print control and storage register 30. Reference to the bank statement of FIG. 7 and the stored information of FIG. 5 will reveal that the information stored in the storage locations word 1, digits 1 through 10 and word 2, digits 1 through 8 are printed out in the columns 1 through 18 in the same sequential order as they are stored.

It should be noted at this point, with regard to the validity of the programming by exception that the pieces of information on the bank statement must occur in the stored sequential fashion to represent the correct, intelligible information and no other sequence would suffice. That is, a withdrawal of $1,300.00 must be recorded with the digits 1–3–0–0–0–0 in sequence since any other sequence would represent an erroneous amount.

Therefore, it should now be evident that without program connections between word and digit hubs on the exit plugboard 78 there are no "exceptions" programmed in. This allows groups of data signals to be shifted out to the print control and storage register 30 and then printed out in an order determined by that in which the signals are received and stored by the means for storing data signals 46. Therefore, the groups of data signals in word 1 and digits 1 through 10 storage locations are first shifted out to the print control and storage register 30, then those in the word 2, digits 1 through 10 storage location, etc. This operation continues until the storage register in the print control and storage register 30 is full and a high potential signal is applied to the stop edit line 39, which causes the source of clock pulses 50 to stop developing clock pulses at its output circuit CP. The printing and storage unit 14 then goes into a print cycle where the group of data signals stored in the print control and storage register 30 are sequentially printed out by the print unit 32.

Assume now that the data signals stored in the means for storing data signals 46 are again those shown in FIG. 5 and are in an order different from that in which they are to be printed out by the print unit 32. Assume that the deposits amount is stored in the storage locations word 2, digits 3 through 8, and the balance amount is stored in the storage locations word 1, digits 7 through 10 and word 2, digits 1 and 2. This means that the storage locations now cannot be sequentially addressed as in the above example but "exceptions" must be programmed or wired in the plugboards so that the groups of data signals stored in the means for storing data signals 46 will be rearranged before being read by the print control and storage register 30. Thus the means for storing data signals 46 must first shift out data signals stored in word 1, digits 1 through 6, then the data signals stored in word 2, digits 3 through 8 and followed by those stored in word 1, digits 7 through 10, and word 2, digits 1 and 2. Following this latter group of data signals it is necessary to program an exception to skip the digits 3 through 8 of word 2 since they have been printed out and to commence the sequential print out with word 2, digit 9. This program is written out in FIG. 6.

In order to perform this rearrangement using programming by "exception" the program steps of FIG. 8 are needed. The impulse from the scan emitter is used to reset the word counter 62 and the digit counter 64 to state one. This allows the groups of data signals representing the withdrawal amount to first be shifted out to the print control and storage register 30. To effectuate this program step a wire is connected between the scan emitter on the exit plugboard 78 and the units hub 1 and digit hub 1 on the entry plugboard 76. The second step uses the impulse from the word 1 digit 6 hub to set the word counter 64 to state two and the digit counter to state three. This selects the first group of data signals of the deposits amount and allows the deposits amount to be shifted out next. Thus to effectuate this program step a wire is connected between the word 1 digit 6 hub on the exit plugboard 78 and the units hub 2 and digits hub 3 on the entry plugboard 76. The third step is to use the word 2 digit 8 pulse to reset the word counter to state one and the digit counter to state seven. This selects the first group of data signals of the balance amount and allows the balance amount to be shifted out next. To effectuate this a wire is connected between the word 2, digit 8 hub on the exit plugboard 78 and the units 1 hub and the digit 7 hub on the entry plugboard 76. Step 4 is to use the word 2, digit 3 pulse to set the digit counter 64 to state nine. This selects the first group of data signals of the next groups to be shifted out by means for storing data signals 46. To effectuate this a wire is connected between the word 2, digit 3 hub on the exit plugboard 78 and the units hub 2 and the digit hub 9 on the entry plugboard 76.

Consider now the operation of the editing system 12 as shown in FIG. 3 with the programed exceptions described above. Initially, the start switch 48 is actuated causing the scan counter 54 to be reset to state one, the monostable multivibrator 56 is triggered into a true state and the source of clock pulses 50 starts developing clock pulses. The clock pulse signal at the end of state one of the scan counter 54 triggers the scan counter 54 into state two. The clock pulse signal at the end of state two triggers scan counter into state three and sets both the word counter 62 and the digit counter 64 into state one.

During the state one of the scan counter 54, the second time, word counter 62 and digit counter 64 are still in state one and the corresponding storage location in the means for storing data signals 46 is addressed. Referring to FIG. 5, this causes a group of data signals representing the numeral one to be applied to the data lines 33. During state two, the second time, the digit counter 64 is counted into state two. During state three of the scan counter 54, data signals corresponding to those stored in the word 1 digit 1 storage location are still applied to the data lines 33 and the "and" gating circuit 60 develops a high potential signal on the read data lines 35 causing the first group of data signals of the withdrawal amount to be read and stored by the print control and storage register 30. During the following five times the scan counter 54 is in state three the rest of the groups of data signals of the withdrawal amount are applied to the data lines 33 and read and stored by the print control and storage register 30.

Assume now that the scan counter 54 is in state two, the word counter 62 is in state one and the digit counter 64 is in state six. The data signals stored in the word 1, digit 6 storage location of the means for storing data signals 46 are now being applied on the data lines 33 by the means for storing data signals 46. Also, there is a high potential signal on the word 1, digit 6 hub of the exit plugboard 78 causing a high potential signal on the units hub 2 and the digits hub 3 on the entry plugboard 78. Thus during state two, the word counter 62 is set to state two and the digit counter 64 is set to state three. During state three of the scan counter 54 a high potential signal is applied on the read data line 35 by the "and"

gating circuit 60. This causes the print control and storage register 30 to read the data signals on the data lines 33.

During the following state one of the scan counter 54 the word 2, digit 3 storage location of the means for storing data signals 46 is addressed and a group of signals representing the number 1 is applied to the data lines 33. During state two of the scan counter 54, the digit counter 64 is placed into state four. During the following state three of the scan counter 54 the group of data signals representing a number one is still applied to the data lines 33 and therefore read by the print control and storage register 30.

When the scan counter 54 goes into state three the following four times, groups of data signals from the storage locations word 2, digits 4 through 8 will be applied to the data lines 33 and read by the print control and storage register 30.

Assume now that the word counter is in state two and the digit counter 64 in state eight. A group of data signals representing the numeral 0 from the storage location word 2, digit 8 is applied to the data lines 33. A high potential signal is developed at the word 2 digit 8 hub on the exit plugboard 78 causing a high potential signal at the unit 1, digit 7 hub on the entry plugboard 76. This causes the word counter 62 to be set to state one and the digit counter 64 to state even. During state three of the scan counter 54 a high potential signal is applied to the read data line 35 causing the print control and storage register 30 to read the group of data signals on the data lines 33.

Since the storage location word 1 digit 7 contains data signals corresponding to the first group of data signals of the balance amount, during the following state three of the scan counter 54 the first character of the balance amount will be applied to the data lines 33 and stored by the print control and storage register 30.

During the following five times that the scan counter 54 goes into state three the remainder of the groups of signals of the balance amount are applied to the data lines 33 and read and stored by the print control and storage register 30. After the word counter 62 counts into state two and the digit counter 64 counts into state two a high potential signal is applied to the units hub 2, digit hub 2 on the entry plugboard 76 causing the digit counter 64 to be set to state 9. Thus it is seen that after the balance amount is shifted out of the means for storing data signals 46, the first of the next group or groups of data signals is selected by a programmed "exception" and the printing system 12 continues on sequentially shifting out groups of data signals from storage locations in the means for storing data signals 46 from this point on until another programed "exception" is reached.

When a group or groups of data signals in the means for storing data signals 46 are to be rearranged all that is needed is to select the beginning of the group or groups of data signals by setting the word counter 62 and the digit counter 64 to the appropriate states and then allowing the editing system 12 to sequentially shift out the following groups of data signals. The editing system 12 will then continue sequentially shifting out data signals until another point is reached where an "exception" has been programed in and the beginning of another group or groups of data signals is selected.

Other editing operations may be performed by programming by "exception," for example, groups of data signals representing sign characters, and data signals representing blanks, which are to be left on the paper as the characters are printed out, may be inserted in between digits of data signals stored in the means for storing data signals 46. Also, stored digits may be converted absolutely or conditionally to other characters such as a credit symbol CR or a debit symbol DB. An example of a conditional conversion is a group of data signals may be converted to another group of data signals on the condition that the number to be converted is an even number or an odd number.

Before explaining FIG. 12, a brief explanation of terminology to be used will be given. Flip-flop circuits are bistable devices such as the Eccles-Jordan trigger circuits having two states, a true state and a false state. The flip-flop circuit will be designated by a capital letter followed by a number, i.e., C1, I1, etc. A flip-flop circuit has two input circuits and two output circuits, the output circuits being represented by the letter designation of the flip-flop circuit followed by a number subscript corresponding to the flip-flop number and to distinguish between the two output circuits a prime is affixed to the designation of one of the output circuits, thus $C_1$, $C_1'$, $I_1$ and $I_1'$.

When the unprimed output circuit is a high potential level, the primed output circuit is a low potential level and the flip-flop circuit is said to be true. When the unprimed output circuit is a low potential level and the primed output circuit a high potential level, the flip-flop circuit is said to be false. The input circuits of the flip-flop circuits are designated by a lower case letter followed by a number corresponding to the capital letter and number, designating the flip-flop circuits. A subscript 1 and 0 is used in front of the lower case letter to designate the input which when pulsed sets the flip-flop circuit true and false, respectively, thus, $_1c1$, $_0c1$, $_1i1$, $_0i1$.

Figure 12:
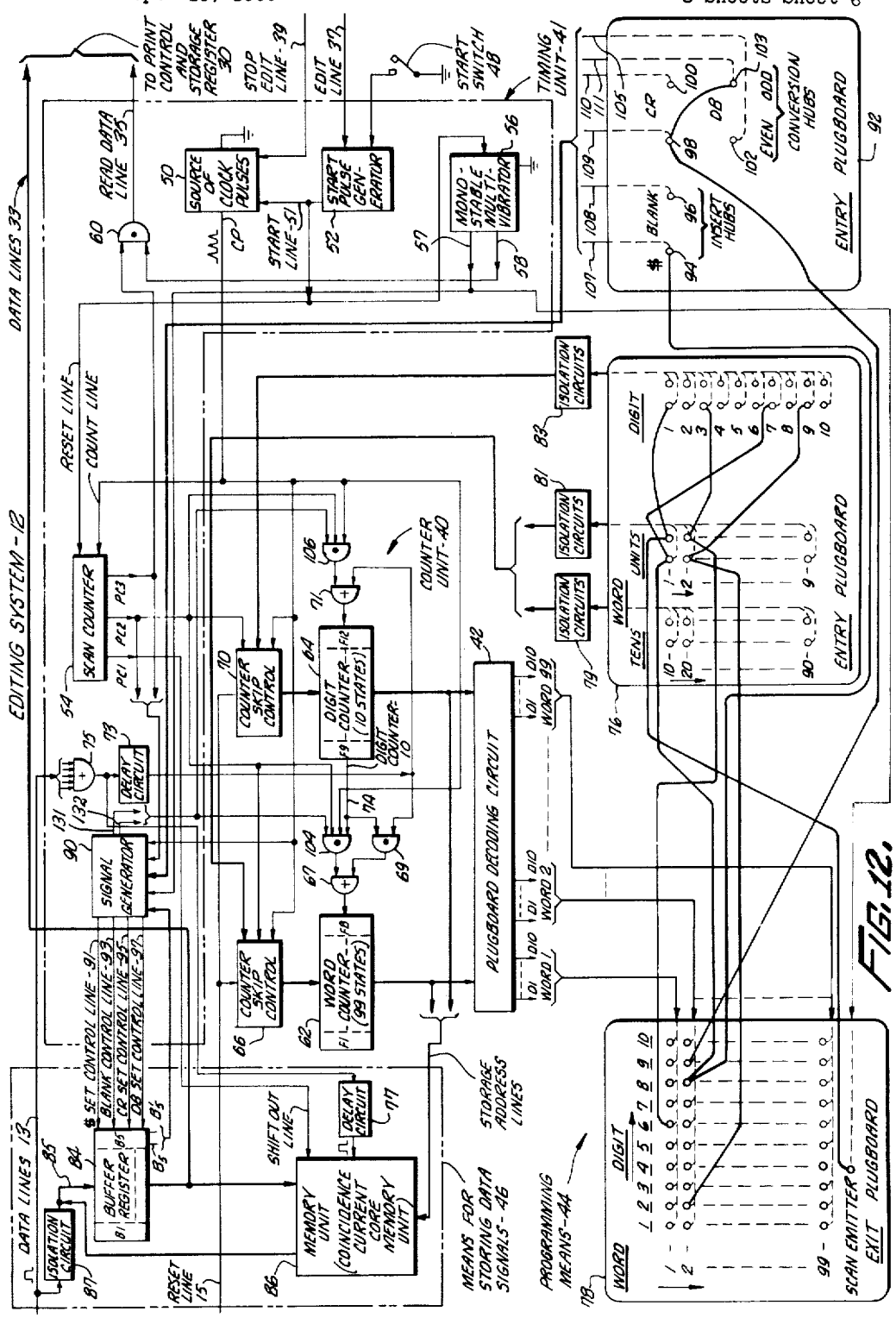
FIG. 12 is another specific schematic diagram partly in block form, of an editing system utilizing programing by "exception" and embodying the present invention.

Referring now to FIG. 12 wherein a modification of the editing system of FIG. 3 is illustrated to include the latter-mentioned features of programing by "exception." To illustrate these "exceptions" the means for storing data signals 46 is shown as comprising a buffer register 84 and a memory unit 86.

The buffer register 84 comprises five flip-flop circuits designated B1 through B5 with associated gating circuits (not shown) for triggering the flip-flop circuits into states corresponding to the received input signals. The buffer register 84 has one input circuit connected in parallel circuit arrangement with the lines 85. The lines 85 comprise the same number of lines as in the data lines 13 and each is connected to an end of one of the data lines 13 through the isolation circuit 87. The isolation circuits are unilaterally conductive circuits in between the lines 85 and the data lines 13 and may be similar to the unilateral circuits of FIG. 4. The isolation circuit 87 allows signals to pass from the data lines 13 to the lines 85, however, it blocks signal flow in the reverse direction, as is well known. Other input circuits connected to a dollar sign, set control line 91, a blank space set control line 93, a credit, CR, set control line 95 and a debit, DB, set control line 97. The buffer register 84 is responsive to a group of data signals applied to the data lines 13 and thus the lines 85 to store the data signals. The buffer register 84 is also responsive to signals on the lines 91, 93, 95 and 97 to automatically store signals in the flip-flop circuits B1 through B5 representative of a dollar sign, a blank space, a credit symbol and a debit symbol, respectively, to be explained in detail.

The memory unit 86 is a coincident current core memory unit arranged with ninety-nine words of storage space, each word of storage space comprising space for storing ten digit signals or groups of data signals. The memory unit 86 contains all the necessary read and write circuits for energizing all the core units of a digit of storage space. Thus the core units of a digit of storage space are simultaneously energized for shifting a group of data signals out and similarly for writing a group of data signals therein. It should also be noted that in a preferred embodiment of the invention a nondestructive type of core memory unit is used in which the storage content of each storage location is retained after shifting signals out. This allows the stored signals to be shifted out again at a subsequent time. The memory unit 86 has an input circuit connected in parallel circuit arrangement to the output circuit of the buffer register circuit 84.

Also an output circuit is connected in parallel circuit arrangement to the lines 85. The core memory circuit 86 has storage address lines connected to the output circuits of the word counter 62 and the digit counter 64. The memory unit 86 also has an input circuit connected to the PC1 output circuit of the scan counter 54 and is responsive to a high potential signal on the PC1 output circuit for addressing the storage location specified by the state of the word counter 62 and the digit counter 64. When a storage location is addressed, the group of data signals stored in the addressed storage location is shifted to the output circuit and applied to the lines 85 in parallel where the signals are automatically stored by the buffer register 84. The memory unit 86 also has an input circuit connected to the output circuit of a delay circuit 77. The memory unit 86 is responsive to a high potential output signal of the time delay circuit 77 to store a group of data signals corresponding to those stored in the buffer register 84. Again the storage location is specified by the states of the word counter 62 and the digit counter 64.

The input circuit of the delay circuit 77 is connected to the output circuit of the "or" gating circuit 75 in the timing circuit 41. The time delay circuit 77 has a shorter time delay than the time delay circuit 73.

Whenever a group of data signals is applied on the data lines 13, a high potential output signal is developed at the input circuit of the delay circuit 77. Thus a group of data signals is first applied to the data lines 13, and stored in the buffer register 84. The time delay circuit 77 then causes the memory unit 86 to read and store the signals stored in the buffer register 84. After the signals are stored in the memory unit 86 the time delay circuit 73 causes the word counter 62 and digit counter 64 to count to their next state.

An insert and conversion entry plugboard 92 is provided in the programing means 44 for inserting a group of data signals in between groups of data signals stored in the memory unit 86 and for conditionally converting signals representing characters stored in the memory unit 86 to signals representing other characters. There are two hubs 94 and 96 in the entry plugboard 92 for making inserts, the hub 94 is for inserting signals representing a dollar sign and the hub 96 is for inserting signals representing blanks, which ultimately cause the print unit 32 to leave spaces on the paper as characters are printed out.

The entry plugboard 92 has four conversion hubs 98, 100, 102 and 103 designated by the symbols credit even, credit odd, debit even and debit odd, respectively. The credit even hub 98 and the credit odd hub 100 are for conditionally converting a group of data signals representing a character to signals representing the character credit.

The hubs 94, 96, 98, 100, 102 and 103 are connected to lines 105, 107, 108, 109, 110 and 111, which are connected to input circuits of the signal generator 90. The signal generator 90 has other input circuits connected to the output circuits of the scan counter 54, the source of clock pulses 50, the $B_5$ and $B_5'$ output circuits of the flip-flop circuits B5 in the buffer register B4, and the line 57 connected to the output circuit of the monostable multivibrator 56. The signal generator 90 has output circuits connected to the set control lines 91, 93, 95, 97, and the input circuits of the "and" gating circuits 104 and 106, and an "and" gating circuit 144.

Refer now to FIG. 13, which shows a circuit diagram, partly in block form, the signal generator 90 will be examined in more detail. Two insert circuits are shown 113 and 115. Considering the insert control circuit 113, dollar sign hub 94 is connected, by means of the line 107 to the $_1c1$ input circuit of a dollar flip-flop circuit C1 through an "and" gating circuit 112. Another input circuit of the "and" gating circuit 112 is connected to the PC2 output circuit of the scan counter 54. The $_0c1$ input circuit of the dollar flip-flop circuit C1 is connected to the output circuit of an "or" gating circuit 114. The "or" gating circuit 114 has two input circuits which are connected to the PC2 output circuit of the scan counter 54 and the line 57, connected to the monostable multivibrator 56. In the following discussion an "or" gating circuit provides a high potential output signal only when any one or more of its input signals are at a high potential level. Thus the flip-flop circuit C1 will be triggered true, if it is false, at the occurrence of a clock pulse, whenever there is a high potential signal at the dollar sign hub 94 and a high potential signal is developed at the output circuit PC2 of the scan counter 54. Also the flip-flop circuit C1 will be triggered false at the occurrence of a clock pulse, if it is true, whenever a high potential signal is developed at the output circuit PC2 of the scan counter 54 or on the line 57. An "and" gating circuit 138 has two input circuits which are connected to an insert line or the $C_1$ output circuit of the flip-flop circuit C1 and the PC2 output circuit of the scan counter circuit 54. The output circuit of the "and" gating circuit 138 is connected to the dollar set control line 91. An inhibit flip-flop circuit I1 is provided. The inhibit flip-flop circuit I1 has its $_1i1$ input circuit connected to the output circuit of an "and" gating circuit 126, which has two input circuits, one input circuit is connected to the $C_1$ output circuit of flip-flop circuit C1 and the other is connected to the output circuit PC3 of the scan counter 54. The $_0i1$ input circuit of the flip-flop circuit I1 is connected to the output circuit of an "or" gating circuit 128, which has two input circuits, one input circuit is connected to the line 57 and the other is connected to the output circuit of an "and" gating circuit 130. The "and" gating circuit 130 has two input circuits, one input circuit being connected to the $C_1'$ output circuit of flip-flop circuit C1 and the other input circuit is connected to the output circuit PC3 of the scan counter 54. The $I_1'$ output circuit of the inhibit flip-flop circuit I1 is connected to the line 131 and will be referred to as the inhibit line, to be explained. This line prevents the word counter 62 and the digit counter 64 from counting when the inhibit flip-flop circuit I1 is true.

Thus it is seen that a high potential signal at the output circuit PC3 of the scan counter 57 when the dollar sign flip-flop circuit C1 is true will cause a high potential output signal from the "and" gating circuit 126 to the input circuit $_1i1$ causing the inhibit flip-flop circuit I1 to be triggered true at the occurrence of a clock pulse. Also a high potential signal at the output circuit PC3 simultaneously with a false state of the dollar sign flip-flop circuit C1 or a high potential signal on the line 57 will cause the inhibit flip-flop circuit I1 to be triggered false if it is true. The insert control circuit 115 is identical to the insert control circuit 113 except its input circuit is connected to the blank hub 96 rather than the dollar sign hub 94, and its insert output line is connected to the input circuit of an "and" gating circuit 139. Also an inhibit line 132 is connected to the output circuit of the insert control circuit 115, which is similar to the inhibit line 131 of an "and" gating circuit 139. The "and" gating circuit 139 has another input circuit connected to the PC2 output circuit of the scan counter 54. The output circuit of the "and" gating circuit 139 is connected to the blank set control line 93.

Two conversion control circuits 117 and 122 are provided. The conversion control circuit 117 has the credit even hub 98 connected to an input circuit of an "and" gating circuit 116, which has another input circuit connected to the $B_5$ output circuit of the flip-flop circuit B5 in the buffer register 84. The credit odd hub 100 is connected to an input circuit of an "and" gating circuit 118, which has another input circuit connected to the $B_5'$ output circuit of the B5 flip-flop circuit. The output circuits of the "and" gating circuits 116 and 118 are connected to the input circuits of an "or" gating circuit 120. The output of the "or" gating circuit 12 is connected to a conversion line which is connected to an input circuit of an "and" gating circuit 140. Another input circuit of the "and" gating circuit 140 is connected to the PC2 output circuit of the scan counter 54. The output circuit of the "and" gating circuit 140 is connected to the credit set control line 95. The conversion control circuit 122 is identical to that of the conversion control circuit 111 except that it has input circuits connected to the debit even hub 102 and debit odd hub 103 rather than the credit even hub 98 and the credit odd hub 100. Also the conversion line is connected to an "and" gating circuit 144 which has another input circuit connected to the PC2 output circuit of the scan counter 54. The output circuit of the "and" gating circuit 144 is connected to the debit set control line 97.

Thus a high potential signal applied to the credit even hub 98 simultaneously with the true state of the sign flip-flop B5, or a high potential signal at the credit odd hub 110 simultaneously with the false state of the sign flip-flop B5 will cause a high potential output signal from the "and" gating circuit 120. If the scan counter is in state two when this occurs, a high potential signal is developed on the credit set control line 95. This causes the buffer register 84 to store a group of data signals representing a credit symbol. The operation is similar for the conversion control circuit 122.

The "and" gating circuits 104 and 106 now replace the "and" gating circuits 68 and 72 of the editing system of FIG. 3. This was done to add one more input circuit to each gate. The added input circuit is connected to the inhibit output lines 131 and 132 of the insert control circuits 113 and 115. Thus the digit counter 64 now counts when the inhibit flip-flop circuits in the insert circuits 113 and 115 are false, the scan counter 54 is in state two and there is a clock pulse. The word counter 62 only counts when all these conditions are met and the digit counter 64 is in state ten.

With the specific structure of the editing system 12 shown in FIG. 12 in mind, an example will be given illustrating its operation. Assume that initially the memory unit 86 is loaded with the same groups of data signals shown in FIG. 5 and are to be edited, read and stored by the storage unit 14 for printing. The groups of data signals are to be rearranged as is discussed in connection with FIG. 3, but in addition a dollar sign is to be inserted in front of the balance amount. Further assume, that the digit signal stored in the storage location word 2, digit 9 is to be conditionally converted either to a credit symbol or a debit symbol depending on if it is even or odd, respectively. This time the bank statement is to be used during the printing operation is that shown in FIG. 11 therefore, the dollar sign is to be inserted in column 13, which follows the last digit of the deposits amount and the credit or debit symbols are to be placed in column 20 which follows immediately after the last digit of the balance amount.

FIG. 10 shows the required program for performing these editing operations by "exception." The first four steps of the program are identical to the program shown in FIG. 8 for the editing system of FIG. 3. The fifth step is to use the word 2, digit 8 signal from the exit plugboard 78 to cause a group of data signals representing a dollar symbol to be inserted following the deposits amount. Thus a wire is needed from the word 2 digit 8 hub on the exit plugboard 78 to the dollar sign hub 94 on the entry plugboard 92. Step 6 is to use the signal from the word 2 digit 9 exit plugboard 78 to cause either a credit symbol or a debit symbol to be placed after the end of the balance amount. This step is performed by connecting a wire from the word 2 digit 9 hub on the exit plugboard 78 to the credit even hub 98 and the debit odd hub 103 on the entry plugboard 92.

Having wired the plugboard for the program shown in FIG. 10, the start switch 48 is actuated. This causes an output pulse from the start pulse generator 52 which resets the scan counter 54 to state one, the monostable multivibrator 56 into a true state and causes the source of clock pulses 50 to start developing clock pulses. Since the monostable multivibrator 56 is true, the first clock pulse resets the flip-flop circuits in the insert control circuits 113 and 115 in the signal generator 90 and counts the scan counter 54 into state two. During state two of the scan counter 54 the scan emitter causes a high potential signal to be applied to the units 1 digit 1 hub on the entry plugboard 76. Therefore, the clock pulse signal at the end of state two of the scan counter 54 resets the word counter 62 and the digit counter 64 to state one and counts the scan counter 54 into state three. During state three the monostable multivibrator 56 is still true, therefore, the "and" gating circuit 60 develops a low potential output signal on the line 35. Since the potential on the line 35 is a low potential, the print control and storage register does not read the contents of the buffer register 84. The clock pulse signal at the end of state two of the scan counter 54 counts it into state one.

During state one of the scan counter 54 the second time the word counter 62 and the digit counter 64 are both in state one causing the word 1 digit 1 storage location of the memory unit 86 to be addressed, and the signal stored there to be shifted out and stored in the buffer register 84. During state two of the scan counter 54 the digit counter 64 is counted into state two and the scan counter 54 is counted into state three. During state three of the scan counter 54 the "and" gating circuit 60 develops a high potential output signal on the line 35 and causes the print control and storage register 30 to read the group of data signals stored in the buffer register 84.

Thus it is seen that each time the scan counter 54 counts into state one, the storage location corresponding to the states of the word counter 62 and digit counter 64 are addressed and the group of data signals in these storage locations stored in the buffer register 84. Each time the scan counter 54 goes into state two the word counter 62 and the digit counter 64 are counted up one state and each time the scan counter 54 goes into state three the group of data signals in the buffer register 84 is read by the print control and storage register 30. This cycle is repeated until all of the groups of data signals of the withdrawal amount stored have been shifted into the buffer register and then read by the print control and storage register 30.

When the word counter 62 and the digit counter 64 are in states one and six, respectively, a signal is applied to the word 1 digit 6 hub on the exit plugboard 78. Since this hub is connected to the units 2 digits 3 hub on the entry plugboard 76, the word counter 62 and the digit counter 64 are set into states two and three, respectively. As explained above, this selects the storage location which contains the first group of data signals of the deposits amount and the groups of data signals of the deposits amount are sequentially shifted into the buffer register 84 and then read by the print control and storage register 30.

Assume now that the scan counter 54 is in state two, the word counter 62 is in state two and the digit counter 64 is in state eight. The buffer register 84 contains the group of data signals corresponding to those stored in the word 2 digit 8 storage location of the memory unit 86. A high potential signal is applied to the word 2 digit 8 hub on the exit plugboard 78 causing a high potential signal on the units 1 digit 7 hub of the entry plugboard 76. This also causes a high potential signal on the dollar sign insert hub 94. The line 107 connects the high potential signal at the dollar sign insert hub 94 to the input circuit of the signal generator 90. The clock pulse signal at the end of state two of the scan counter 54 triggers the dollar flip-flop C1 true, sets the word counter 62 and the digit counter 64 into states one and seven, respectively, and counts the scan counter 54 into state three. During the following state three of the scan counter 54 the dollar flip-flop circuit C1 is true, a high potential signal is applied on the read data line 35 by the "and" gating circuit 60, causing the group of data signals in the buffer register 84 to be read. The clock pulse signal at the end of state three of the scan counter 54 triggers the inhibit flip-flop circuit I1 true and counts the scan counter 54 into state one.

During state one of the scan counter 54 the word counter 62 is in state one, the digit counter 64 is in state seven and the dollar flip-flop circuit C1 and the inhibit flip-flop circuit I1 are true. Thus the word counter 62 and the digit counter 64 address the word 1 digit 7 storage location in the memory unit 86 and causes the group of data signals stored there to be shifted out and stored by the buffer register 84. During state two of the scan counter 62 the dollar flip-flop circuit C1 and the inhibit flip-flop circuit I1 are still true and a high potential signal is developed on the dollar set control line 91 by the signal generator 90. This forces the buffer register 84 to destroy the group of data signals stored therein and forces the storage register 84 to store signals representing a dollar sign. The clock pulse signal at the end of state two of the scan counter 54 triggers the dollar flip-flop circuit C1 false and counts the scan counter 54 into state three. It should be noted that since the inhibit flip-flop I1 was true, the "and" gating circuits 104 and 106 developed a low potential output signal during state two of the scan counter 54 and the word counter 62 and the digit counter 64 are not counted to their next state but remain in states one and seven, respectively. During state three of the scan counter 54 data signals representing a dollar sign digit are still stored in the buffer register 84 and a high potential output signal is developed on the read data line 35 by the "and" gating circuit 60, which causes the print control and storage register 30 to read and store the dollar sign signals. The dollar flip-flop circuit C1 is now false, and the inhibit flip-flop circuit I1 is true, and the clock pulse signal at the end of state three of the scan counter 54 triggers the inhibit flip-flop I1 false and counts the scan counter 54 into state one.

During the following state one the word counter 62 and digit counter 64 are still in states one and seven, respectively, and the corresponding memory location of the memory unit 86 is addressed. The group of data signals in the word 1 digit 7 storage location are again shifted into the buffer register 84. During the following states two and three the digit counter 64 is counted into state eight and the group of data signals stored in the buffer register 84 are read by the print control and storage register 30.

In summary, during an insert operation the group of data signals which would be printed out in the absence of the insert operation is first shifted into the buffer register 84. Next, the group of data signals stored in the buffer register 84 is destroyed and the digit representing the character to be inserted is forced into the buffer register 84. The word counter 62 and the digit counter 64 are inhibited from counting to the next state so that the next group of data signals are not lost. Since the word counter 62 and digit counter 64 are inhibited from counting into their next state, the digit signal which was destroyed in the buffer register 84 will again be shifted into the buffer register 84 at a later time. After the group of data signals representing the character to be inserted is forced into the buffer register 84 the timing unit 41 develops a high potential output signal on the line 35 which causes the print control and storage register 30 to read the inserted signals. Next, the memory unit 86 is again addressed and the group of data signals which was previously destroyed is again shifted into the buffer register 84 and this time read by the print control and storage register 30.

Returning now to the program of FIG. 12 and the conversion operation, the word counter 62 and the digit counter 64 are now in states two and eight, respectively, and the first digit of the balance amount has been shifted into the buffer register 84 and read by the print control and storage register 30. Subsequently, the following five groups of data signals of the balance amount are shifted into the buffer register 84 and read by the print control and storage register 30. When the word counter 62 and the digit counter 64 reach states two and three, respectively, they are set to states two and nine, respectively.

Assume now that the scan counter is in state two and the word counter 62 and the digit counter 64 are in states two and nine, respectively. The buffer register 84 now contains a group of data signals corresponding to that stored in the word two digit nine storage location in the memory unit 86. Referring to FIG. 5, it is seen that the digit is a number zero. Since the number zero is an even number, the sign flip-flop circuit B5 is true. A high potential signal is now developed at the word two digit nine hub on the exit plugboard 78 causing a high potential signal on the credit even conversion hub 98 and the debit odd conversion hub 103. Since the sign flip-flop circuit B5 is true, a high potential output signal is developed by the conversion control circuit 117 and therefore on the credit set control line 95. This forces the flip-flop circuits in the buffer register 84 to destroy the group of data signals representing a number zero and to store a group of data signals representing a credit character. The clock pulse at the end of state two of the scan counter 54 counts the digit counter 84 into state ten. During state three of the scan counter 54 the group of data signals representing a credit character is stored in the buffer register 84 and a high potential output signal is developed on the read data line 35 by the "and" gating circuit 60, causing the print control and storage register 30 to read the contents of the buffer register 84. The next group of data signals to be stored in the buffer register 84 and read by the print control and storage register 30 is that stored in the storage location word 2 digit 10. Thus it is seen that the digit signal stored in word 2 digit 9 has not been read by the print control and storage register 30 but is only used to determine whether a credit symbol or a debit symbol is to be printed out.

In summary during a conversion operation the digit to be conditionally converted is first shifted into the buffer register 84 and then, depending on whether it is even or odd, the digit signal in the buffer register 84 is converted either to a credit symbol or a debit symbol and the signals in the buffer register 84 are read by the print control and storage register 30. Referring to FIG. 11 it is seen that with the program or wiring arrangement shown in FIG. 12 the signals in the storage location to be conditionally converted never appears in the line of print. However, it should be noted that if the wire had been connected only to the credit even symbol conversion hub 98 and the digit stored in the word 2 digit 9 storage location were odd rather than even that the digit signal in word 2 digit 9 would have been printed out in the line of print when odd. However, with the alternate wiring arrangement, a credit symbol would be printed out when the number is even.

It should be understood that a blank may be placed in the line of print in the same manner as the dollar sign symbol was inserted merely by connecting the appropriate exit plugboard hub to the blank insert hub 96. Also other insert and conversion operations may be introduced by "exception." For example, an insert control circuit may be added to the signal generator 90 having counters and gating circuits for inserting a number of groups of data signals representing blanks into the buffer register 84. Also the conversion control circuit 117 could be eliminated entirely and the line 110 from the credit even conversion hub 98 wired directly to the "and" gating circuit 140. Such an arrangement would remove the conditional feature of the conversion and cause the digit in the buffer register to always be converted regardless of the number.

What is claimed is:

1. In a programable data processing system wherein only exceptions to a normal sequence of steps of processing are programed comprising: programing means including a plurality of separate electrical entry means and a plurality of electrical exit means, the entry and exit means being adapted for electrical interconnection such that a signal formed at an exit means is coupled to a connected entry means, means for storing data signals to be processed, program counting means for normally counting through a sequence of program steps each step corresponding to a separate one of said exit means and a stored data signal and including means adapted for applying a unique electrical signal to the corresponding exit means concurrently with each said program step, means for performing a predetermined processing operation concurrently with each program step, on the stored data signal corresponding to said step, and skip control means coupled to said entry means and adapted for causing said program counting means to skip to a program step corresponding to the entry means receiving an electrical signal for causing program steps to be skipped and the normal sequence of steps of processing to be altered in accordance with a prearranged program for processing the stored data signals.

2. In a programable data processing system wherein exceptions to a normal sequence of steps of processing are programed comprising: programing means including a plurality of separate electrical entry means and a plurality of electrical exit means, adapted for electrical interconnection such that a signal formed at an exit means is coupled to a connected entry means addressable memory means having memory locations for storing data signals to be processed, program counting means for normally counting through a sequence of program steps representative of sequentially addressable memory locations of the memory means and including means adapted for applying a unique electrical signal to at least one exit means concurrently with the corresponding program step, means for reading the data signals out of the memory locations of the memory means represented by the program steps of the program counting means, and skip control means coupled to said entry means and adapted for causing said program counting means to skip to a program step corresponding to an entry means receiving an electrical signal for thereby altering the normal sequence of reading in accordance with a prearranged program for processing the stored data signals.

3. In a programable data processing system wherein exceptions to a normal sequence of steps of processing are programed comprising: programing means including a plurality of separate pluggable electrical entry connectors and a plurality of pluggable electrical exit connectors, adapted for electrical interconnection such that a signal formed at an exit connector is coupled to a connected entry connector, addressable memory means having memory locations for storing data signals to be processed, program counting means for normally counting through a sequence of program steps representative of sequentially addressable memory locations of the memory means and corresponding to a sequence of said exit connectors, decoding means adapted for causing an electrical signal to be applied to at least one exit connector concurrently with the corresponding program step, means for reading the data signals out of the memory locations of the memory means corresponding to the program steps of the program counting means, and skip control means coupled to said entry connectors and adapted for causing said program counting means to skip to a program step corresponding to an entry connector receiving an electrical signal for thereby altering the normal sequence of reading in accordance with a prearranged program for processing the stored data signals.

4. In a programable editing system wherein exceptions to a normal sequence of steps of editing are programed including: addressable memory means having a plurality of sequentially addressable memory locations for storing characters of data, programing means including a separate exit electrical means corresponding to each of said memory locations and at least one conversion electrical means for a predetermined character with which a character stored in the memory means is to be replaced, said exit and conversion electrical means being adapted for electrical interconnection such that a signal formed at an exit electrical means is coupled to a connected conversion electrical means, program counting means for normally counting through a sequence of program step, representative of said exit means and sequentially addressable memory locations of the memory means and including means adapted for applying a unique electrical signal to an exit means concurrently with the corresponding program step, means for normally reading the characters out of the memory locations of the memory means represented by the states of the program counting means, register means for storing the characters read out of the memory means, character by character, and means for causing the predetermined character, corresponding to the conversion electrical means, to be stored in the register means in response to an electrical signal applied at the conversion means thereby causing the predetermined character to replace the character in the memory location of the memory means corresponding to the exit means connected to the conversion means in accordance with a prearranged plan for editing.

5. In a programable editing system as defined in claim 4 wherein characters stored in the memory means are conditionally converted to the predetermined character depending on the value of the character to be converted, said means for storing signals in said register comprising gating means responsive to the electrical signal applied at the conversion means substantially simultaneously with the above-mentioned predetermined value of a character stored in the register means for replacing the character stored in the register means with the predetermined character.

6. In a programable editing system wherein exceptions to a normal sequence of steps of editing are programed including: addressable memory means having a plurality of sequentially addressable memory locations for storing characters of data, programing means including a separate exit electrical means corresponding to each of said memory locations and at least one insert electrical means for a special insert character to be inserted in between two characters to be read out of the memory means, said exit and insert electrical means being adapted for electrical interconnection such that a signal formed at an exit electrical means is coupled to a connected insert electrical means, program counting means for normally counting through a sequence of program steps representative of said exit means and said sequentially addressable memory locations of the memory means and including means adapted for applying a unique electrical signal to an exit connector concurrently with the corresponding program step, means for normally reading the characters out of the memory locations of the memory means represented by the sequential program steps of the program counting means, register means for storing the characters read out of the memory means, character by character, count inhibit means for momentarily inhibiting the counting of the program counting means concurrently with an electrical signal applied at the insert means, means for storing the special insert character in the register means concurrently with an electrical signal applied at the insert means for causing the special insert character to be inserted in between two characters read out of the memory means in accordance with a prearranged plan for editing.

7. In a programable editing system as defined in claim 6, wherein the inhibit means comprises at least two bistable elements, one of the bistable elements being arranged to provide an inhibit signal to the program counting means for stopping the counting thereof and the other bistable element being arranged for providing a signal to the register means indicative of the special character to be stored therein.

8. In a data processing system including: a source of data signals to be processed; printing means including means adapted for printing out visible symbols corresponding to data signals applied thereto; an editing system comprising, programing means including a plurality of electrical entry connectors and a plurality of electrical exit connectors, said entry and exit connectors being adapted for electrical interconnection such that a signal formed at an exit connector is coupled to a connected entry connector, addressable memory means having a plurality of sequentially addressable memory locations, corresponding to said plurality of exit connectors, for storing data and including means adapted for storing data signals from said source into the memory means, program counting means for normally counting through a sequence of program steps representative of said exit connectors and said sequentially addressable memory locations of the memory means and including means adapted for providing a unique electrical signal to an exit connector concurrently with the corresponding program step, means for reading the data signals out of the memory locations of the memory means represented by the program steps of the program counting means for said printing means and skip control means coupled to said entry connectors and adapted for causing said program counting means to skip to a step corresponding to an entry means receiving an electrical signal for causing program steps to be skipped and the normal sequence of reading to be altered in accordance with a prearranged program for edit-for printing.

9. In a programable data processing system wherein exceptions to a normal sequence of steps of processing are programed comprising: addressable memory means having a plurality of memory locations for storing characters to be processed, programing means including a plurality of electrical entry connectors, a plurality of electrical exit connectors, and at least one insert electrical connector for a special insert character to be inserted in between two processed characters, the entry and exit connectors corresponding to memory locations, said entry, exit and insert connectors being adapted for electrical interconnection such that a signal formed at an exit connector is coupled to a connected entry or insert connector, program counting means for normally counting through a sequence of program steps representative of said exit connectors and said sequentially addressable memory locations of the memory means and including means adapted for applying an electrical signal to an exit connector concurrently with the corresponding program step, means for reading the characters out of the memory locations of the memory means represented by the program steps of the program counting means, register means for storing the characters read out of the memory means, character by character, skip control means coupled to said entry connectors and adapted for causing the program counting means to skip to a program step corresponding to the entry connector receiving an electrical signal, count inhibit means for momentarily inhibiting the counting of the program counting means concurrently with an electrical signal applied at the insert connector, means for storing the special insert character in the register means concurrently with the electrical signal applied at the insert connector, the skip control means and special insert character storing means thereby causing the normal sequence of reading to be altered and the special insert character to be inserted between two characters stored in the register means in accordance with a prearranged program for processing the stored characters.

10. In a programable data processing system wherein exceptions to a normal sequence of steps of processing are programed comprising: addressable memory means having a plurality of memory locations for storing characters to be processed, plugboard programing means including a plurality of electrical entry connectors, a plurality of electrical exit connectors, and at least one conversion electrical connector for a conversion character with which a character stored in the memory means is to be replaced, said entry, exit and conversion electrical connectors being adapted for electrical interconnection such that a signal formed at an exit connector is coupled to a connected entry or conversion connector, program counting means for normally counting through a sequence of program steps representative of said exit connectors and said sequentially addressable memory locations of the memory means and including means adapted for applying an electrical signal to an exit connector concurrently with the corresponding program step, means for reading the characters out of the memory locations of the memory means represented by the program steps of the program counting means, register means for storing the characters read out of the memory locations of the memory means, character by character, skip control means coupled to said entry connectors and adapted for causing said programing means to skip to a program step corresponding to the entry connector receiving an electrical signal, means for storing the conversion character, corresponding to the conversion connector, in the register means in response to an electrical signal applied at the conversion connector the skip control means and conversion character storing means thereby causing the normal sequence of reading to be altered and for causing the conversion character to replace the character in the memory location of the memory means corresponding to the exit connector connected to the conversion connector, in accordance with a prearranged program for processing the stored characters.

11. In a programable data processing system wherein exceptions to a normal sequence of steps of processing are programed comprising: addressable memory means having a plurality of memory locations for storing characters to be processed, plugboard programing means including a plurality of electrical entry connectors and a plurality of electrical exit connectors, at least one electrical connector for a special insert character to be inserted in between two processed characters and at least one conversion electrical connector for a conversion character with which a character stored in the memory means is to be replaced, the entry and exit connectors corresponding to said memory locations, said electrical connectors being adapted for electrical interconnection such that a signal formed at an exit connector is coupled to a connected entry, or conversion or insert connector program counting means for normally counting through a sequence of program steps representative of said exit connectors and said sequentially addressable memory locations of the memory means and including means adapted for applying an electrical signal to at least one of an exit connector concurrently with the corresponding program step, means for reading the characters out of the memory locations of the memory means represented by the program steps of the program counting means, register means for storing the characters read out of the memory means, character by character, skip control means coupled to the entry connectors and adapted for causing said program counting means to skip to a program step corresponding to the entry connector receiving an electrical signal, count inhibit means adapted for momentarily inhibiting the counting of the program counting means concurrently with an electrical signal applied at the insert connector, means for storing the special insert character in the register means concurrently with the electrical signal applied at the insert connector, means for storing the conversion character in the register means in response to an electrical signal applied at the conversion connector, said skip control means, insert storing means and conversion storing means thereby causing the normal sequence of reading to be altered, thereby causing the special insert character to be inserted between two processed characters stored in the register means, and thereby causing the predetermined conversion character to replace the character in the memory location of the memory means corresponding to the exit connector connected to the conversion connector in accordance with a prearranged program for processing the stored characters.

12. In a programable data processing system wherein only exceptions to a normal sequence of program steps are programed, comprising: means for storing a plurality of data signals to be processed, program counting means for normally counting through a sequence of program steps, each of the steps corresponding to a different one of said stored data signals, programing means for storing a program causing the programing means to provide signals indicating program steps into which the program counting means is to skip, for altering a normal sequence of program steps, means arranged independent of said stored program for normally performing a preselected processing operation concurrently with each program step on the stored data signal corresponding to such step, and skip control means for causing the program counting means to skip to the program step corresponding to the signal indications by said programing means.

References Cited by the Examiner

UNITED STATES PATENTS

| | | | |
|---|---|---|---|
| 2,792,991 | 5/1957 | Di Cambio | 235—157 |
| 2,910,236 | 10/1959 | Harper | 235—157 |
| 2,923,469 | 2/1960 | Woodbury | 235—157 |
| 2,985,865 | 5/1961 | Merz | 340—172.5 |

ROBERT C. BAILEY, *Primary Examiner.*

CORNELIUS D. ANGEL, *Examiner.*

UNITED STATES PATENT OFFICE
CERTIFICATE OF CORRECTION

Patent No. 3,233,224  February 1, 1966

Jerry Flickwir Foster et al.

It is hereby certified that error appears in the above numbered patent requiring correction and that the said Letters Patent should read as corrected below.

Column 3, line 58, for "tape" read -- type --; column 4, line 26, for "lines" read -- line --; column 5, line 67, for "electrically" read -- electronically --; column 6, line 26, strike out "these"; column 7, line 36, strike out "data", second occurrence; column 9, line 31, after "put" insert -- signal --; line 66, for "ot" read -- to --; column 14, line 55, for "lines" read -- line --; column 15, line 27, for "even" read -- seven --; column 19, line 52, strike out "is"; column 25, line 37, for "edit-" read -- editing the data signals being applied to the printing means --.

Signed and sealed this 10th day of January 1967.

(SEAL)
Attest:

ERNEST W. SWIDER
Attesting Officer

EDWARD J. BRENNER
Commissioner of Patents